United States Patent [19]

Negi et al.

[11] Patent Number: 4,484,300

[45] Date of Patent: Nov. 20, 1984

[54] DATA PROCESSOR HAVING UNITS CARRY AND TENS CARRY APPARATUS SUPPORTING A DECIMAL MULTIPLY OPERATION

[75] Inventors: Virendra S. Negi, Pepperell; Steven A. Tague, Billerica, both of Mass.

[73] Assignee: Honeywell Information Systems Inc., Waltham, Mass.

[21] Appl. No.: 219,810

[22] Filed: Dec. 24, 1980

[51] Int. Cl.³ .............................................. G06F 7/52
[52] U.S. Cl. ...................................... 364/755; 364/756
[58] Field of Search ............... 364/748, 755, 756, 758, 364/759

[56] References Cited

U.S. PATENT DOCUMENTS

| | | | |
|---|---|---|---|
| 3,319,056 | 5/1967 | Bennett ............................... | 364/756 |
| 4,027,147 | 5/1977 | Majos et al. ........................ | 364/759 |
| 4,075,704 | 2/1978 | O'Leary .............................. | 364/748 |

Primary Examiner—Jerry Smith
Attorney, Agent, or Firm—George Grayson; Nicholas Prasinos

[57] ABSTRACT

A data processing system executes a decimal multiply instruction by storing the product of a multiplier decimal digit and a multiplicand decimal digit in a read only memory and storing partial product decimal digits in a register. The units product decimal digit is read from the read only memory during one cycle and added to a partial product decimal digit. A resulting units carry is stored in a units carry flip-flop. The tens product decimal digit is read from the read only memory during another cycle and added to a higher order partial product decimal digit. A resulting tens carry is stored in a tens carry flip-flop. A multiplexer selects the output of the units carry flip-flop for adding the units carry during the next units cycle in which the next units product decimal digit is added to the higher order partial product decimal digit. The multiplexer selects the output of the tens carry flip-flop for adding the tens carry during the next tens cycle in which the next tens product decimal digit is added to a next higher order partial product decimal digit.

5 Claims, 15 Drawing Figures

OPERAND 1 - MULTIPLIER - PACKED DECIMAL, TRAILING SIGN

| | | (+) | |
|---|---|---|---|
| X X | X 7 | 8 B | X X |

MAIN MEMORY 4
BYTE ADDRESS LOCATIONS: A04 | A05 | A06 | A07
WORD ADDRESS LOCATIONS: 502 | 503
(HEXADECIMAL)

OPERAND 2- MULTIPLICAND-ASCII, TRAILING SIGN

| (0) | (0) | (9) | (8) | (7) | (6) | (5) | (4) | (3) | (2) | (1) | (0) | (+) | |
|---|---|---|---|---|---|---|---|---|---|---|---|---|---|
| 30 | 30 | 39 | 38 | 37 | 36 | 35 | 34 | 33 | 32 | 31 | 30 | 2B | X X |
| 10A0 | 10A1 | 10A2 | 10A3 | 10A4 | 10A5 | 10A6 | 10A7 | 10A8 | 10A9 | 10AA | 10AB | 10AC | 10AD |
| 850 | | 851 | | 852 | | 853 | | 854 | | 855 | | 856 | |

| MAIN MEMORY 4 WORD ADDRESS LOCATIONS | DATA | DESCRIPTION |
|---|---|---|
| 1000 | 0029 | DECIMAL MULTIPLY OPERATION CODE |
| 1001 | E381 | DATA DESCRIPTOR 1 } OPERAND 1 |
| 1002 | 0002 | DISPLACEMENT 1 |
| 1003 | 6D01 | DATA DESCRIPTOR 2 } OPERAND 2 |
| 1004 | 0350 | DISPLACEMENT 2 |

CIP 10 RECEIVES

| FUNCTION CODE | DATA | DESCRIPTION |
|---|---|---|
| 07 | XXXX 0029 | DECIMAL MULTIPLY OPERATION CODE |
| 09 | X000 0A05 | EFFECTIVE BYTE ADDRESS 1 } OPERAND 1 |
| 0F | XXXX E381 | DATA DESCRIPTOR 1 |
| 09 | X000 10A0 | EFFECTIVE BYTE ADDRESS 2 } OPERAND 2 |
| 1F | XXXX 6D01 | DATA DESCRIPTOR 2 |

| DML | COUNTER 1 88-1 | COUNTER 2 88-2 | COUNTER 3 88-3 | OP1A 84 | OP1 64 | RFD 50-1 AA 50-2 | RFD 50-1 AB 50-3 | OP2 66 | OP2A 78 | MIER 52 X OP1 64 | CARRY U | CARRY T |
|---|---|---|---|---|---|---|---|---|---|---|---|---|
| 100 |  | 00 |  |  | X X X 7 8 B X X |  | 8 |  | F |  | 0 | 0 |
| 102 |  |  |  | C | X X X 7 8 B X X |  |  |  | F |  |  |  |
| 105 |  |  |  | B | X X X 7 8 B X X |  |  |  | E | 8 |  |  |
| 110 | 00 |  |  | B |  |  |  |  |  |  |  |  |
| 200 |  |  | 01 | B |  |  |  |  |  |  |  |  |
| 205 |  |  | 01 | 7 |  | F |  |  |  |  |  |  |
| 210 |  |  | 01 | 7 | 3 3 3 2 3 1 3 0 | E |  |  |  |  |  |  |
| 220 |  |  | 01 | 7 |  |  | 8 | 0 0 0 0 0 0 0 0 |  |  |  |  |
| 225 | 09 | 09 | 01 | 7 |  |  |  | 0 0 0 0 0 0 0 0 | E |  |  |  |
| 230 | 09 | 09 | 01 | 7 | 3 0 |  |  | 0 0 0 0 0 0 0 0 | D | 8 X 3 0 - X 0 | 0 |  |
| 235 | 08 | 08 | 01 | 5 | 3 0 |  |  | 0 0 0 0 0 0 0 0 | D | - 0 X | 0 |  |
| 230 | 08 | 08 | 01 | 5 | 3 1 |  |  | 0 0 0 0 0 8 0 0 | C | 8 X 3 1 - X 8 | 0 |  |
| 235 | 07 | 07 | 01 | 3 | 3 1 |  |  | 0 0 0 0 0 8 0 0 | C | - 0 X | 0 |  |
| 230 | 07 | 07 | 01 | 3 | 3 2 |  |  | 0 0 0 0 6 8 0 0 | B | 8 X 3 2 - X 6 | 0 |  |
| 235 | 06 | 06 | 01 | (0001)1 | 3 2 |  |  | 0 0 0 1 6 8 0 0 | B | - 1 X | 0 |  |
| 230 | 06 | 06 | 01 | (0001)1 | 3 3 |  |  | 0 0 0 5 6 8 0 0 | A | 8 X 3 3 - X 4 | 0 |  |
| 235 | 05 | 05 | 01 | 7 | 3 3 3 2 3 1 3 0 | E |  | 0 0 2 5 6 8 0 0 | A | - 2 X | 0 |  |
| 250 | 05 | 05 | 01 | 7 | 3 7 3 6 3 5 3 4 | D |  | 0 0 2 5 6 8 0 0 | A |  |  |  |
| 230 | 05 | 05 | 01 | 7 | 3 4 |  |  | 0 0 4 5 6 8 0 0 | 9 | 8 X 3 4 - X 2 | 0 |  |
| 235 | 04 | 04 | 01 | 5 | 3 4 |  |  | 0 3 4 5 6 8 0 0 | 9 | - 3 X | 0 |  |
| 230 | 04 | 04 | 01 | 5 | 3 5 |  |  | 0 3 4 5 6 8 0 0 | 8(1000) | 8 X 3 5 - X 0 | 0 |  |
| 235 | 03 | 03 | 01 | 3 | 3 5 |  |  | 4 3 4 5 6 8 0 0 | 8(1000) | - 4 X | 0 |  |
| 230 | 03 | 03 | 01 | 3 | 3 6 | 8 |  | 2 3 4 5 6 8 0 0 | F | 8 X 3 6 - X 8 | 1 |  |
| 240 | 03 | 03 | 01 | 3 | 3 6 | 7 |  | 2 3 4 5 6 8 0 0 | F |  | 1 |  |
| 245 | 03 | 03 | 01 | 3 |  |  |  | 0 0 0 0 0 0 0 0 | F |  | 1 |  |
| 235 | 02 | 02 | 01 | (0001)1 |  |  |  | 0 0 0 0 0 0 0 4 | F | - 4 X | 1 | 0 |
| 230 | 02 | 02 | 01 | (0001)1 | 3 7 |  |  | 0 0 0 0 0 0 0 1 | E | 8 X 3 7 - X 6 | 1 |  |
| 235 | 01 | 01 | 01 | 7 | 3 7 3 6 3 5 3 4 | D |  | 0 0 0 0 0 5 1 | E | - 5 X | 1 | 0 |
| 250 | 01 | 01 | 01 | 7 | 3 0 3 0 3 9 3 8 | C |  | 0 0 0 0 0 5 1 | E |  | 1 |  |
| 230 | 01 | 01 | 01 | 7 | 3 8 |  |  | 0 0 0 0 0 0 1 | D | 8 X 3 8 - X 4 | 1 | 0 |
| 235 | 00 | 00 | 01 | 5 | 3 8 |  |  | 0 0 0 0 6 0 1 | D | - 6 X | 1 |  |
| 230 | 00 | 00 | 01 | 5 | 3 9 |  |  | 0 0 0 0 9 0 1 | C | 8 X 3 9 - X 2 | 0 | 0 |
| 235 | FF | FF | 01 | 3 | 3 9 |  |  | 0 0 0 7 9 0 1 | C | - 7 X | 0 |  |
| 255 | FF | FF | 01 | 3 |  | 7 |  | 0 0 0 0 7 9 0 1 | C |  |  |  |
| 260 | FF | FF | 01 | 3 | 3 0 3 0 3 9 3 8 | 7 |  | 0 0 0 0 7 9 0 1 | C |  |  |  |

Fig. 8.

| DML | COUNTER 1 88-1 | 2 88-2 | 3 88-3 | OP1A 84 | OP1 64 | RFD 50-1 AA 50-2 | AB 50-3 | OP2 66 | OP2A 78 | MIER 52 X OP1 64 | CARRY U | T |
|---|---|---|---|---|---|---|---|---|---|---|---|---|
| 265 | | | 00 | C | X X X 7 8 B X X | | | | | | | |
| 270 | 00 | | 00 | C | | | | 8 | E | | | |
| 100 | | | | C | | | | | | | | |
| 102 | | | | B | | | | | | | | |
| 105 | | | | A | X X X 7 8 B X X | | | | D | 7 | | |
| 150 | | | | 7 | | F | | | | | | |
| 210 | | | | 7 | 3 3 3 2 3 1 3 0 | E | | | | | | |
| 220 | | | | 7 | | | | 8→2 3 4 5 6 8 0 0 | | | | |
| 225 | 09 | 09 | 00 | 7 | | | | | D | | | |
| 230 | 09 | 09 | 00 | 7 | 3 0 | | | 2 3 4 5 6 8 0 0 | C | 7 X 3 0 - X 0 | 0 | |
| 235 | 08 | 08 | 00 | 5 | 3 0 | | | 2 3 4 5 6 8 0 0 | C | - 0 X | | 0 |
| 230 | 08 | 08 | 00 | 5 | 3 1 | | | 2 3 4 5 3 8 0 0 | B | 7 X 3 1 - X 7 | 1 | |
| 235 | 07 | 07 | 00 | 3 | 3 1 | | | 2 3 4 5 3 8 0 0 | B | - 0 X | 1 | 0 |
| 230 | 07 | 07 | 00 | 3 | 3 2 | | | 2 3 4 0 3 8 0 0 | A | 7 X 3 2 - X 4 | 1 | |
| 235 | 06 | 06 | 00 | 1 | 3 2 | | | 2 3 5 0 3 8 0 0 | A | - 1 X | 1 | 0 |
| 230 | 06 | 06 | 00 | 1 | 3 3 | | | 2 3 7 0 3 8 0 0 | 9 | 7 X 3 3 - X 1 | 0 | |
| 235 | 05 | 05 | 00 | 7 | 3 3 3 2 3 1 3 0 | E | | 2 5 7 0 3 8 0 0 | 9 | - 2 X | 0 | 0 |
| 250 | 05 | 05 | 00 | 7 | 3 7 3 6 3 5 3 4 | D | | | 9 | | | 0 |
| 230 | 05 | 05 | 00 | 7 | 3 4 | | | 2 5 7 0 3 8 0 0 | 8(1000) | 7 X 3 4 - X 8 | 1 | |
| 235 | 04 | 04 | 00 | 5 | 3 4 | | | 4 3 7 0 3 8 0 0 | 8(1000) | - 2 X | 1 | 0 |
| 230 | 04 | 04 | 00 | 5 | 3 5 | | 8 | 0 3 7 0 3 0 0 0 | F(1111) | 7 X 3 5 - X 5 | 1 | |
| 240 | 04 | 04 | 00 | 5 | | | 7 | 0 3 7 0 3 8 0 0 | F | | | 1 |
| 245 | 04 | 04 | 00 | | | | | 0 0 0 0 7 9 0 1 | F | | | 1 |
| 235 | 03 | 03 | 00 | 3 | 3 5 | | | 0 0 0 0 7 9 0 4 | F | - 3 X | 1 | 0 |
| 230 | 03 | 03 | 00 | 3 | 3 6 | | | 0 0 0 0 7 9 0 7 | E | 7 X 3 6 - X 2 | 0 | |
| 235 | 02 | 02 | 00 | 1 | 3 6 | | | 0 0 0 0 7 9 4 7 | E | - 4 X | 0 | 0 |
| 230 | 02 | 02 | 00 | 1 | 3 7 | | | 0 0 0 0 7 9 3 7 | D | 7 X 3 7 - X 9 | 1 | |
| 235 | 01 | 01 | 00 | 7 | 3 7 3 6 3 5 3 4 | D | | 0 0 0 0 7 3 3 7 | D | - 4 X | 1 | 1 |
| 250 | 01 | 01 | 00 | 7 | 3 0 3 0 3 9 3 8 | C | | | D | | | 1 1 |
| 230 | 01 | 01 | 00 | 7 | 3 8 | | | 0 0 0 0 7 0 3 7 | C | 7 X 3 8 - X 6 | 1 | 1 |
| 235 | 00 | 00 | 00 | 5 | 3 8 | | | 0 0 0 0 3 0 3 7 | C | - 5 X | 1 | 1 |
| 230 | 00 | 00 | 00 | 5 | 3 9 | | | 0 0 0 0 7 0 3 7 | B | 7 X 3 9 - X 3 | 0 | 1 |
| 235 | FF | FF | 00 | 3 | 3 9 | | | 0 0 0 7 7 0 3 7 | B | - 6 X | 0 | 0 |
| 255 | FF | FF | 00 | 3 | 3 0 3 0 3 9 3 8 | 7 | | 0 0 0 7 7 0 3 7 | | | | |
| 295 | | | | | | | | 0 0 0 7 7 0 3 7 | | | | |

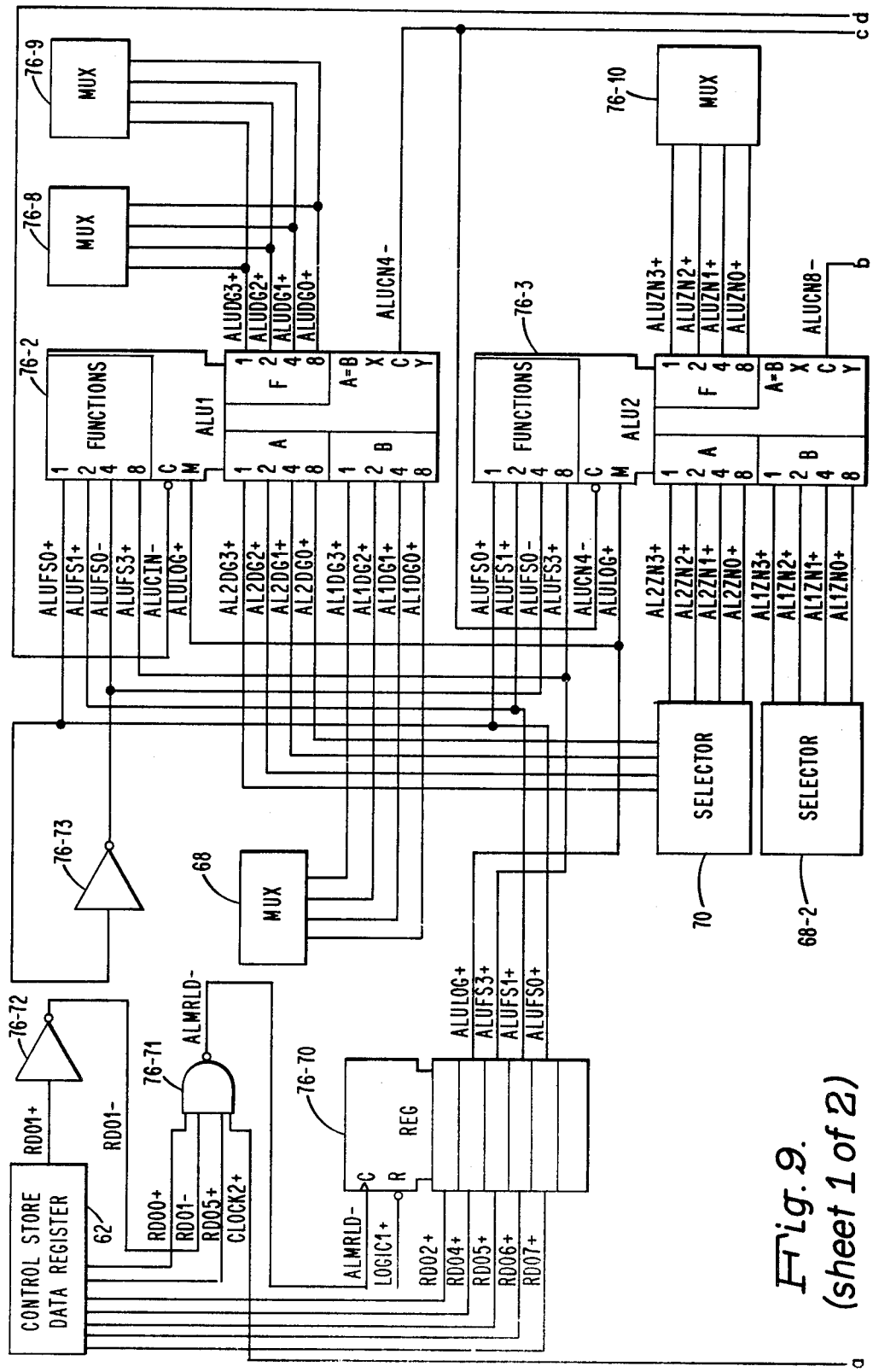
Fig. 9. (sheet 1 of 2)

DATA PROCESSOR HAVING UNITS CARRY AND TENS CARRY APPARATUS SUPPORTING A DECIMAL MULTIPLY OPERATION

RELATED APPLICATIONS

The following U.S. patent applications filed on an even date with the instant application and assigned to the same assignee as the instant application are related to the instant application and are incorporated by reference.

1. "A Data Processor Performing a Decimal Multiply Operation Using a Read Only Memory" by Virendra S. Negi and Steven A. Tague, filed on Dec. 24, 1980 and having U.S. Ser. No. 220,218.

2. "A Data Processor Having Carry Apparatus Supporting a Decimal Divide Operation" by Virendra S. Negi and Steven A. Tague, filed on Dec. 24, 1980 and having U.S. Ser. No. 219,638.

3. "A Data Processor Using Read Only Memory for Optimizing Main Memory Access and Identifying the Starting Position of an Operand" by Steven A. Tague and Virendra S. Negi, filed on Dec. 24, 1980 and having U.S. Ser. No. 219,809.

4. "A Data Processor Having Apparatus for Controlling the Selection of Decimal Digits of an Operand When Executing Decimal Arithmetic Instructions" by Steven A. Tague and Virendra S. Negi, filed on Dec. 24, 1980 and having U.S. Ser. No. 220,220.

5. "A Data Processor Using a Read Only Memory for Selecting a Part of a Register Into Which Data Is Written" by Steven A. Tague and Virendra S. Negi, filed on Dec. 24, 1980 and having U.S. Ser. No. 220,219.

BACKGROUND OF THE INVENTION

1. Field of the Invention

The present invention relates generally to data processing systems and more particularly to carry apparatus used when the system executes a decimal multiply instruction.

2. Description of the Prior Art

Numerous techniques for multiplying two numbers are known in the prior art. Some such techniques are described in the book entitled "Digital Computer Design Fundamentals" by Y. Chu, published by McGraw-Hill Book Company Inc., 1962.

U.S. Pat. No. 3,319,056 is typical of the technique wherein a decimal digit multiplicand and a decimal digit multiplier are processed by forming partial products. The partial products are formed by adding the multiplicand decimal digits to the partial product the number of times specified by each multiplier decimal digits. The multiplicand is shifted one decimal digit position relative to the partial product for each higher order multiplier decimal digit. A partial product decimal digit at a digit position is developed by adding the carry decimal digit generated from the lower order digit position to the partial product decimal digit on one cycle to generate a new partial product decimal digit, and by adding the multiplicand decimal digit to the new partial product decimal digit on a next cycle to generate the partial product decimal digit at this digit position. Also, a 4 bit counter is required to develop the carry for the next higher digit position of the partial product.

This approach presents the problem of requiring an additional carry cycle for each decimal digit in the multiplier, thereby increasing the time for executing the decimal multiply instruction. Also, the 4 bit carry counter with its associated control logic increases the cost and complexity of the system.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

Accordingly, it is a primary object of the present invention to provide an improved apparatus for executing the decimal multiply instruction by a data processing system.

It is another object of the present invention to provide carry apparatus which decreases the number of cycles required for executing the decimal multiply instruction.

It is yet another object of the present invention to provide carry apparatus for executing the decimal multiply instruction having reduced product and maintenance cost.

SUMMARY OF THE INVENTION

A data processing system includes a commercial instruction processor (CIP) which executes decimal alphanumeric instructions. A decimal multiply instruction is executed by storing the least significant decimal digit in a multiply register 52, storing the multiplicand decimal digits in a register OP1 64, and storing partial product decimal digits in a register OP2 66. Multiplicand decimal digits and the multiplier decimal digits are applied to a multiply PROM 54 which generates a units product decimal digit and a tens product decimal digit.

The units product decimal digit is added in a units cycle to a partial product decimal digit from OP2 66 in an arithmetic logic unit (ALU1 76-2) and the resulting decimal digit replaces the partial product decimal digit. Similarly, the tens product decimal digit is added on a tens cycle to the next higher order partial product decimal digit in the ALU1 76-2 and the resulting decimal digit replaces that next higher order partial product decimal digit. When the multiplication of all of the multiplicand decimal digits by the least significant multiplier decimal digit is completed, the next higher order multiplier is stored in the multiplier register and the above sequence repeated. The multiplication is complete when the most significant multiplier decimal digit has been multiplied by all of the multiplicand digits. The partial product decimal digits stored in OP2 66 indicate the result of the multiplication. This decimal multiply operation is described in copending related application Ser. No. 220,218 entitled "A Data Processor Performing a Decimal Multiply Operation Using a Read Only Memory".

If a carry out of the ALU1 76-2 results during the units cycle from the addition of the units product decimal digit and the partial product decimal digit, then a units carry flip-flop 76-50 is set. If a carry out of the ALU1 76-2 results during the tens cycle from the addition of the tens product decimal digit and a first higher order partial product decimal digit, then a tens carry flip-flop 76-60 is set.

The units carry and tens carry output signals CARYFF— and TNSCRY— are applied to a multiplexer (MUX) 76-40 which selects the units carry signal on the next units cycle and the tens carry signal on the next tens cycle. The units carry is added to the next units product decimal digit and the first higher order partial product decimal digit. The tens carry is added to the next tens product decimal digit and a second higher order partial product decimal digit.

A resulting carry will again set the units carry or tens carry flip-flops.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration and description only and is not intended as a definition of the limits of the present invention.

BRIEF DESCRIPTION OF THE DRAWINGS

FIG. 5 shows the elements of a multiplication example which are used to describe the invention.

FIG. 8 shows the contents of the registers as the CIP 10 is executing the steps of the flow diagram.

DESCRIPTION OF THE PREFERRED EMBODIMENT

Figure 1:
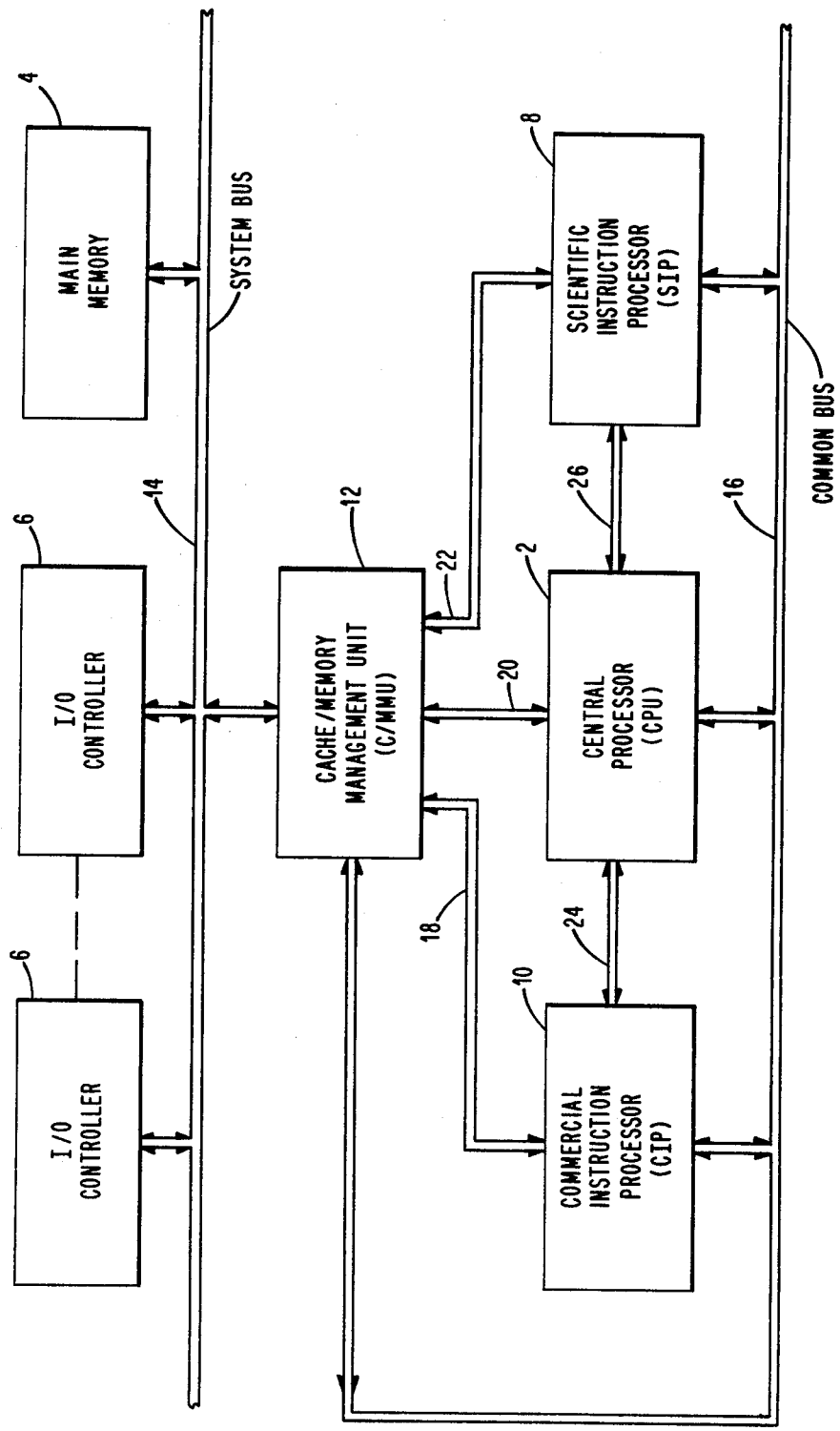
FIG. 1 is a block diagram of the overall data processing system.

FIG. 1 is an overall block diagram of a data processing system which includes a main memory 4, a plurality of input/output controllers 6 and a cache/memory management unit (C/MMU) 12; all coupled in common to a system bus 14. Coupled to the C/MMU 12 are a central processor unit (CPU) 2, a commercial instruction processor (CIP) 10 and a scientific instruction processor (SIP) 8 via buses 20, 18 and 22 respectively. The C/MMU 12, CIP 10, CPU 2 and SIP 8 are coupled in common to a common bus 16. Also, CPU 2 is coupled to the CIP 10 and the SIP 8 via buses 24 and 26 respectively.

The CIP 10 executes a set of instructions designed to facilitate processing of character strings and decimal data. The SIP 8 executes a set of scientific instructions particularly useful for FORTRAN applications. This set includes arithmetic operations on single and double precision floating point operands and single and double word interger operands.

All instructions in a program under execution are received by CPU 2 from C/MMU 12 via buses 16 and 20. CPU 2 determines from the operation code of the instructions if the instruction is to be processed by the CPU 2, the CIP 10, or the SIP 8. The CPU 2 receives status information from the CIP 10 or SIP 8 over buses 24 and 26 respectively. If the CIP 10 or SIP 8 is available, the CPU 2 sends the necessary information out on common bus 16 and also bus 26 for the SIP 8. The CIP 10 or the SIP 8 processes the instruction and is operative with the C/MMU 12 via bus 18 or 22 respectively and bus 16 for processing the instruction.

The CIP 10 processes instructions which include the following:
1. Decimal arithmetic operations on string and packed numeric data.
2. Alphanumeric and decimal move and compare instructions.
3. Conversion between binary and decimal numeric representation.
4. Edit instructions.
5. Arithmetic shift instructions.

Main memory 4 stores instructions and data and is operative with the C/MMU 12 for the transferring of instructions and data over system bus 14 under control of CPU 2 via bus 20. This operation is described in U.S. Pat. No. 4,030,075.

The C/MMU 12 which includes a cache memory stores the instructions and data currently being processed by the CPU 2, CIP 10 and SIP 8. The cache operation is described in U.S. Pat. No. 4,195,340.

The CPU 2 is also operative for initiating transfers of data between the I/O controllers 6 and main memory 4.

Figure 2:
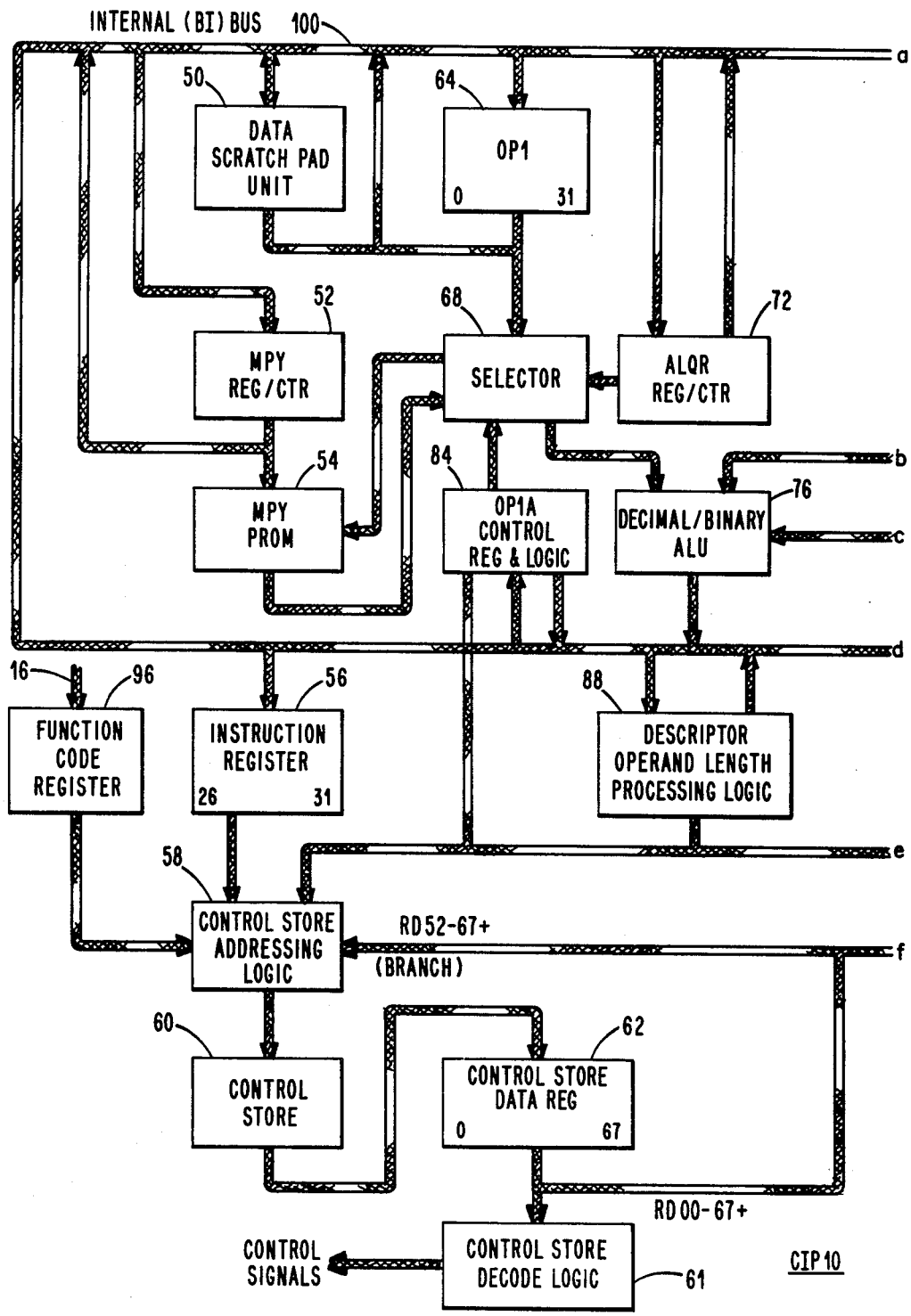
FIG. 2 is a block diagram of the commercial instruction processor 10.
Figure 2:
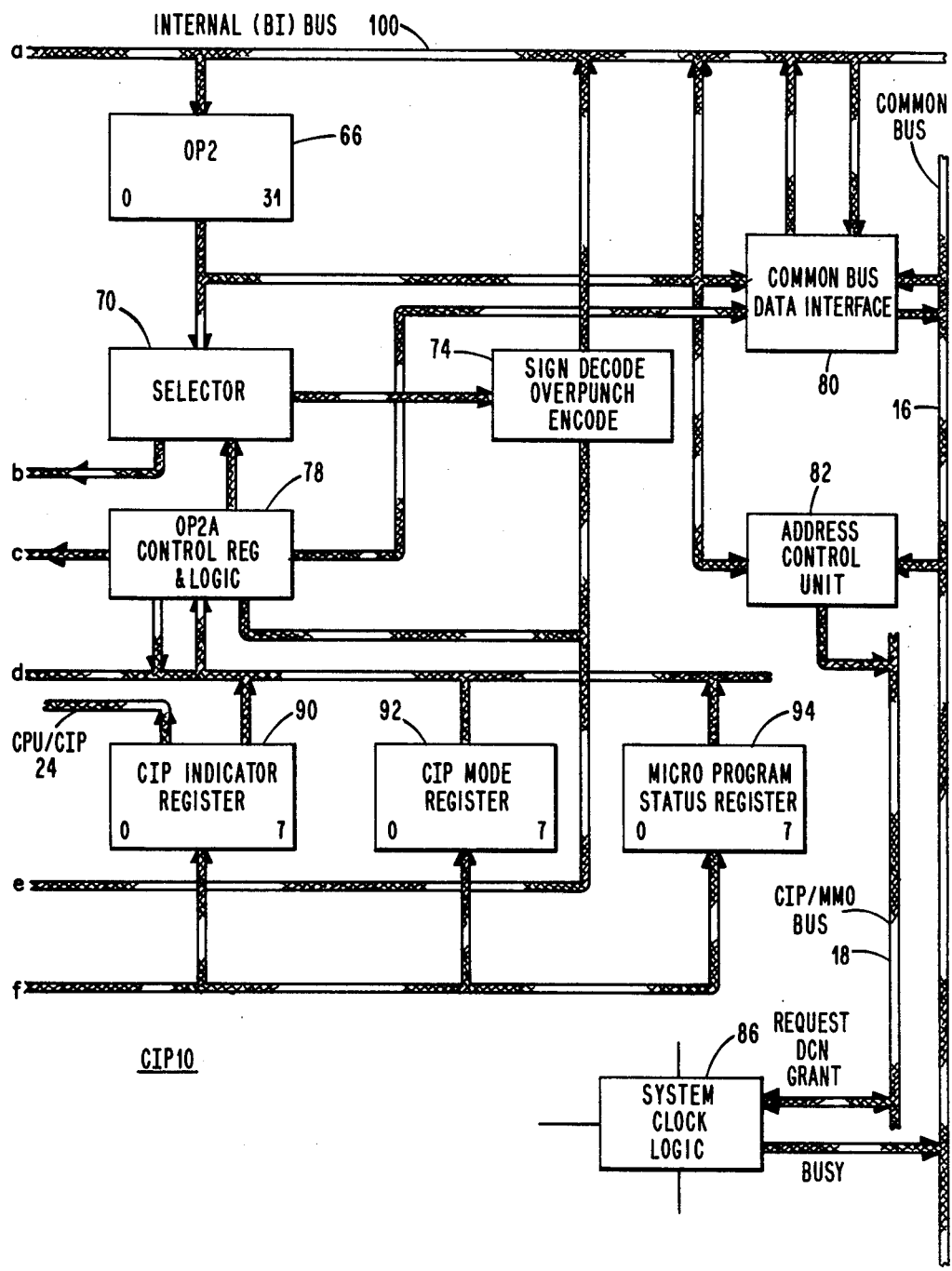

Referring to FIG. 2, all CIP 10 operations except initialization operations from a console are initiated by CPU 2 writing a 6 bit function code into a function code register 96 and a 32 bit double word of data into a portion of a common bus data interface 80 via common bus 16. The CIP 10 when activated transfers the low order 6 bits of the double word into an instruction register 56. If the function code register 96 stores an output task function code $07_{16}$, then the flow order 16 bits of the double word are stored in a portion of an address control unit 82 to allow the CPU 2 to request the previous instruction word at a later time.

The contents of function code register 96 select a firmware word in a control store 60 via control store addressing logic 58. The firmware word is loaded into a control store data register 62 and conditions CIP 10 to receive additional control information from CPU 2. A control store decode logic 61 generates control signals by decoding the output signals RD 00-67+ from control store data register 62. Signals RD 52-67+ applied to control store addressing logic 58 results in control store 60 branching to a specified address location.

The CIP 10 instructions operate on three data types, decimal strings containing binary coded decimal digits, alphanumeric strings containing ASCII characters and binary numbers having 16 or 32 bit precision. Decimal data operands are referenced by the location of the most significant digit and length and may have one or two digits in a byte. Packed decimal operands store two digits per byte and string decimal operands store one digit per byte.

String decimal operands may be unsigned and assumed positive, may have a leading sign byte placed before the most significant decimal byte, a trailing sign byte placed after the least significant decimal byte or a trailing overpunched sign included with the least significant decimal byte.

Packed decimal operands may be unsigned implying a positive sign or have a trailing sign.

Binary data operands have the most significant binary bit as a sign bit with the binary point assumed to the right of the least significant binary bit using 2's complement notation.

The double words received by CIP 10 from CPU 2 following the instruction word specifying a decimal arithmetic operation indicates the decimal type, string or packed, sign information, the length of the operand and the effective address. This is the address of the byte containing the most significant character (4 or 8 bits/character).

Initially during the processing of a decimal numeric instruction, control store 60 generates signals via control store data register 62 causing the address control unit 82 to send the main memory 4 address of the operand 1 word containing the sign character to C/MMU 12. The operand 1 word containing the sign character is received by common bus data interface 80 and stored in OP1 64 and OP2 66. The sign character is selected by selector 70 for transfer to a sign decode overpunch encode logic 74 where it is decoded into status bits indicating an illegal sign or a negative sign. The control store addressing logic 58 is responsive to the illegal sign status bit and the negative sign status bit. If the sign is legal, then the negative sign status bit is stored in the microprogram status register 94. The operand 2 word containing the sign is processed in a similar manner and stored in OP2 66. Selector 70 transfers the sign character to sign decode overpunch encode logic 74 where it is decoded into the illegal sign or the negative sign and stored in the microprogram status register 94. This allows the CIP 10 to abort the instruction and notify the CPU 2 if an illegal sign was detected.

A decimal add instruction is indicated by an output task function code, $07_{16}$ and the instruction register 96 storing hexadecimal $2C_{16}$. During the execution of the decimal add instruction, operand 1 is added to operand 2 and the result of the addition is stored in the location in main memory 4 that stored operand 2.

The CIP 10 waits for the CPU 2 to send the additional control information required for the CIP 10 to execute the decimal add instruction. The additional control information consists of up to 3 double words describing operand 1 and up to 3 double words describing operand 2. The last double word received from the CPU 2 is an output last data descriptor indicated by a function code of $1F_{16}$.

The first of the 3 double words for each operand contains the effective virtual byte address of the operand which indicates the start of the operand in main memory 4, that is, the leftmost or lowest addressed byte containing some of the operand. The second double word may contain an indirect length. The third double word contains the data descriptor which specifies the data type and the position within the initial word received from main memory 4 of the start of the operand. The six double words are stored in the address control unit 82.

The output of instruction register 56 addresses a word in control store 60 to start the CIP 10 execution of the decimal add instruction by sending the main memory 4 address for the low order word of operand 1 containing the least significant decimal digits to the C/MMU 12 via bus 18. The first word of operand 1 is read from main memory 4 or from a cache memory (not shown) in C/MMU 12 and transferred to CIP 10 via common bus 16 and stored in OP1 64. Similarly, the low order word of operand 2 is received by CIP 10 and stored in data scratchpad unit 50 and in OP2 66.

The bit of each data descriptor word describing the characteristics of the two operands (ASCII string or packed) and the computed position of the least significant decimal digit in their respective low order words for operands 1 and 2 are stored in OP1A 84 and OP2A 78 respectively. In addition, the length of operands 1 and 2 is stored in descriptor operand length processing logic 88. The operation of operand length processing logic is described in copending related application Ser. No. 219,809 entitled "A Data Processor Using Read Only Memories for Optimizing Main Memory Access and Identifying the Starting Position of an Operand". The OP1A 84 output is applied to a selector 68 and the OP2A 78 output is applied to a selector 70 for selecting the operand 1 and operand 2 decimal digits as they are transferred from OP1 64 and OP2 66 for processing by a decimal/binary ALU 76, one decimal digit at a time. The resulting decimal digit of the addition is transferred from ALU 76 to OP2 66 via an internal bus (BI) 100, replacing the operand 2 decimal digit that contributed to this result. The operation of OP1A 84 and OP2A 78 are described in copending related application Ser. No. 220,220 entitled "A Data Processor Having Apparatus for Controlling the Selection of Decimal Digits of an Operand When Executing Decimal Arithmetic Instructions" and application Ser. No. 220,219 entitled "A Data Processor Using a Read Only Memory for Selecting a Part of a Register Into Which Data Is Written".

OP1A 84 keeps track of the number of decimal digits remaining in OP1 64 from the transfer of the low order word. When the last decimal digit from the low order word is read from OP1 64 to ALU 76, OP1A 84 signals the branching logic in control store addressing logic 58 to address a word in control store 60 which fetches the next word of operand 1 from main memory 4 via C/MMU 12. The address of the next word of operand 1 is sent from address control unit 82 to C/MMU 12 via bus 18.

Similarly, OP2A 78 signals the branching logic in control store addressing logic 58 to enter into a firmware routine to transfer the resulting word of the addition stored in OP2 66 to common bus data interface 80 for transfer to main memory 4 via common bus 16 to C/MMU 12 at the location specified by the address from address control unit 82 over bus 18. A copy of the result is stored in data scratchpad unit 50. A read cycle is initiated to read the next word of operand 2 by sending the next address from address control unit 82 to C/MMU 12 via bus 18.

When the processing of all of the decimal digits from operand 1 or operand 2 is completed, descriptor operand length processing logic 88 controls the filling out of the field of the result in accordance with the remaining decimal digits of the longer operand.

Initially during the multiply instruction execution, the entire multiplicand, operand 2, is transferred from main memory 4 to the data scratchpad unit 50 via common bus data interface 80 and BI bus 100. A multiplier double word of operand 1 is transferred to OP1 64 via common bus data interface 80 and BI bus 100. The least significant multiplier digit is read into a multiply register/counter 52 from OP1 64 via BI bus 100 and is applied to the input address terminals of a multiply programmable read only memory (PROM) 54. Each double word of the multiplicand in turn is transferred to OP1 64 from the data scratchpad 50. Each multiplicand digit in turn is applied to the remaining input address terminals of PROM 54 from OP1 64 via selector 68 to generate the partial product digits. Each partial product digit is applied to ALU 76 via selector 68 where it is added to a corresponding decimal digit stored in OP2 66 and the resultant partial product stored back in OP2 66.

The next multiplier digit is read into multiply register/counter 52 and the output applied to PROM 54. Again each multiplicand digit in turn is applied to PROM 54 and the partial product digits are applied to ALU 76 via selector 68 where they are added to the selected partial product digits stored in OP2 66. Here again, OP2A 78 controls selector 70 to select the partial product digit to be applied to ALU 76. The partial product result from ALU 76 is again stored in OP2 66 via BI bus 100.

When all of the multiplicand digits stored in data scratchpad unit 50 have been applied to the input address terminals of PROM 54 along with the most significant multiplier decimal digital output of multiply register/counter 52, the data scratchpad unit 50 contains the product of the multiplication. This product is written into main memory 4 via OP2 66, common bus data interface 80 and common bus 16.

A decimal division instruction is executed by receiving the dividend and divisor in common bus data interface 80 from C/MMU 12 via common bus 16 for storage in the data scratchpad unit 50. Portions of the divisor are stored in OP1 64 in turn and portions of the dividend/partial remainder are stored in OP2 66 in turn. The CIP 10 executes the decimal divide instruction by a series of successive subtractions and counting the number of successful subtractions in an ALQR register/counter 72. A successful subtraction is one in which the result is a positive number.

The divisor in OP1 64 is applied to ALU 76 through selector 68, a decimal digit at a time, the least significant decimal digit first. The dividend in OP2 66 is applied to ALU 76 through selector 70, a decimal digit at a time. OP2A 78 controls selector 70 to select the decimal digit from OP2 66 that would cause the most significant decimal digits of the divisor in OP1 64 to be aligned with the most significant decimal digit of the dividend for the subtraction operation. A portion of the decimal division instruction operation is described in copending related application Ser. No. 219,638 entitled "A Data Processor Having Carry Apparatus Supporting a Decimal Divide Operation".

The output of ALU 76 is stored in OP2 66 via BI bus 100 and the contents of ALQR 72 are incremented if the result of the subtraction of the high order decimal digits with the divisor is a positive number. The divisor in OP1 64 is again subtracted from the result of the previous subtraction which is stored in OP2 66 and the contents of ALQR 72 again are incremented if the result of the subtraction is positive.

When the result of the subtraction is a negative number, the divisor stored in OP1 64 is then added to OP2 66 and the contents of ALQR 72 containing a quotient digit are transferred to the data scratchpad unit 50. OP2 66 and data scratchpad unit 50 now contain the result of the last successful subtraction in the high order decimal digits and the remaining decimal digits are the original low order decimal digits of the dividend.

The divisor is subtracted from the dividend one digit position to the right of the previous set of subtractions to develop the next guotient digit. The subtraction operation is repeated as described above with ALQR 72 being incremented for each positive result of the subtraction.

The first quotient digit stored in data scratchpad unit 50 is transferred to OP2 66 via BI bus 100. The contents of ALQR 72 containing the second quotient digit is transferred to OP2 66 via selector 68, ALU 76 and internal bus 100 where it is appended to the first quotient digit for storage in the data scratchpad unit 50. The partial dividend is transferred back to OP2 66 from the data scratchpad unit 50.

The shifting of the divisor and subsequent subtraction operations are repeated until after computing a quotient digit with the least significant decimal digit of the divisor aligned with the least significant decimal digit of the dividend. The last quotient decimal digit from ALQR 72 is merged with the rest of the quotient in the data scratchpad unit 50 and the portion of the remainder now stored in OP2 66 is stored into the data scratchpad unit 50 via BI bus 100. The quotient and remainder in data scratchpad unit 50 are then stored in main memory 4.

A CIP indicator register 90 is set by the control signals to indicate the status of CIP 10. Register 90 includes an overflow indicator which is set during decimal operations when the receiving field cannot store all significant digits of the result or a divide by zero is detected. A truncation indicator is set during alphanumeric operations when the receiving field cannot contain all characters of the result. A signal fault indicator is set during decimal operations when a negative result is stored in an unsigned field. A greater-than indicator is set during the execution of certain decimal and alphanumeric instructions when the result is greater than zero for decimal numeric operations or operand 1 is greater than operand 2 for decimal or arithmetic comparisons. A less-than indicator is set during the execution of certain decimal and alphanumeric instructions when the result is less than zero for decimal arithmetic instructions or operand 1 is less than operand 2 for either decimal or alphanumeric comparisons.

A CIP mode register 92 stores an overflow trap mask and a truncation trap mask which are indications of which special action the CIP 10 and CPU 2 should take when the overflow or truncation condition arises.

A system clock logic 86 includes a 160 nanosecond four phase clock that provides clock signals to trigger all CIP 10 registers and all test and control flip-flops, stabilize registers after loading, signify that address, data, control and parity are valid allowing initiation of a local bus cycle. In addition, the system clock logic 86 may be stalled when additional time is required to complete certain CIP 10 functions. The system clock logic 86 generates a BUSY signal over common bus 16 to indicate the CPU 2 that the CIP 10 is not available, receives a DCN signal from the C/MMU 12 bus to signal the CIP 10 that data for the CIP 10 is on the common bus 8, generates a REQUEST for use of the common bus 16, and waits for a GRANT from the C/MMU 12.

The microprogram status register 94 in addition to storing operand sign information also stores an indication if an overflow was detected in executing a decimal numeric instruction, whether an encode or a decode overpunched sign operation is required, and when a decimal add operation is completed.

Figure 3:
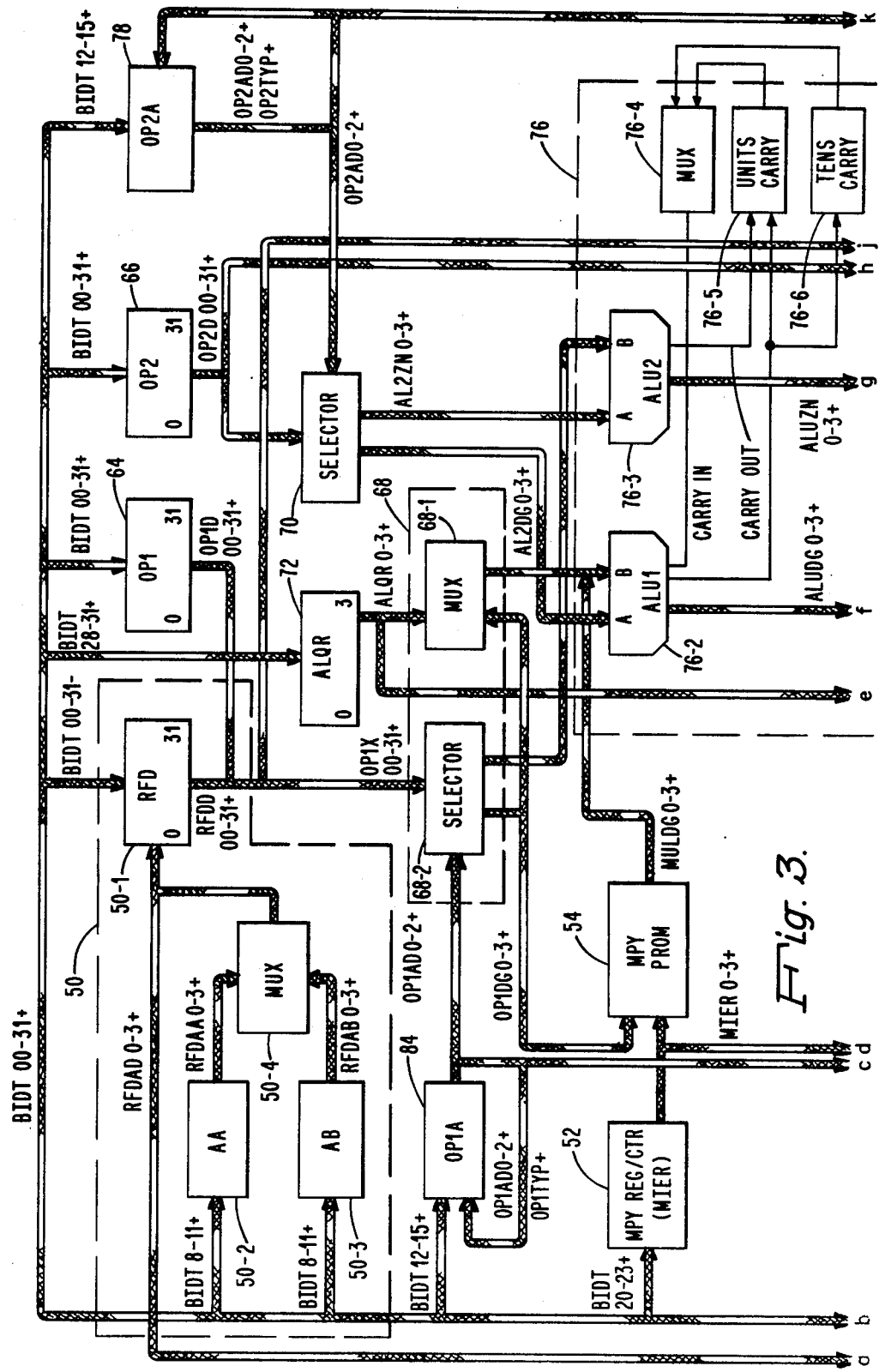
FIG. 3 is a block diagram of that portion of the CIP 10 that relates to the decimal multiply operation.
Figure 3:
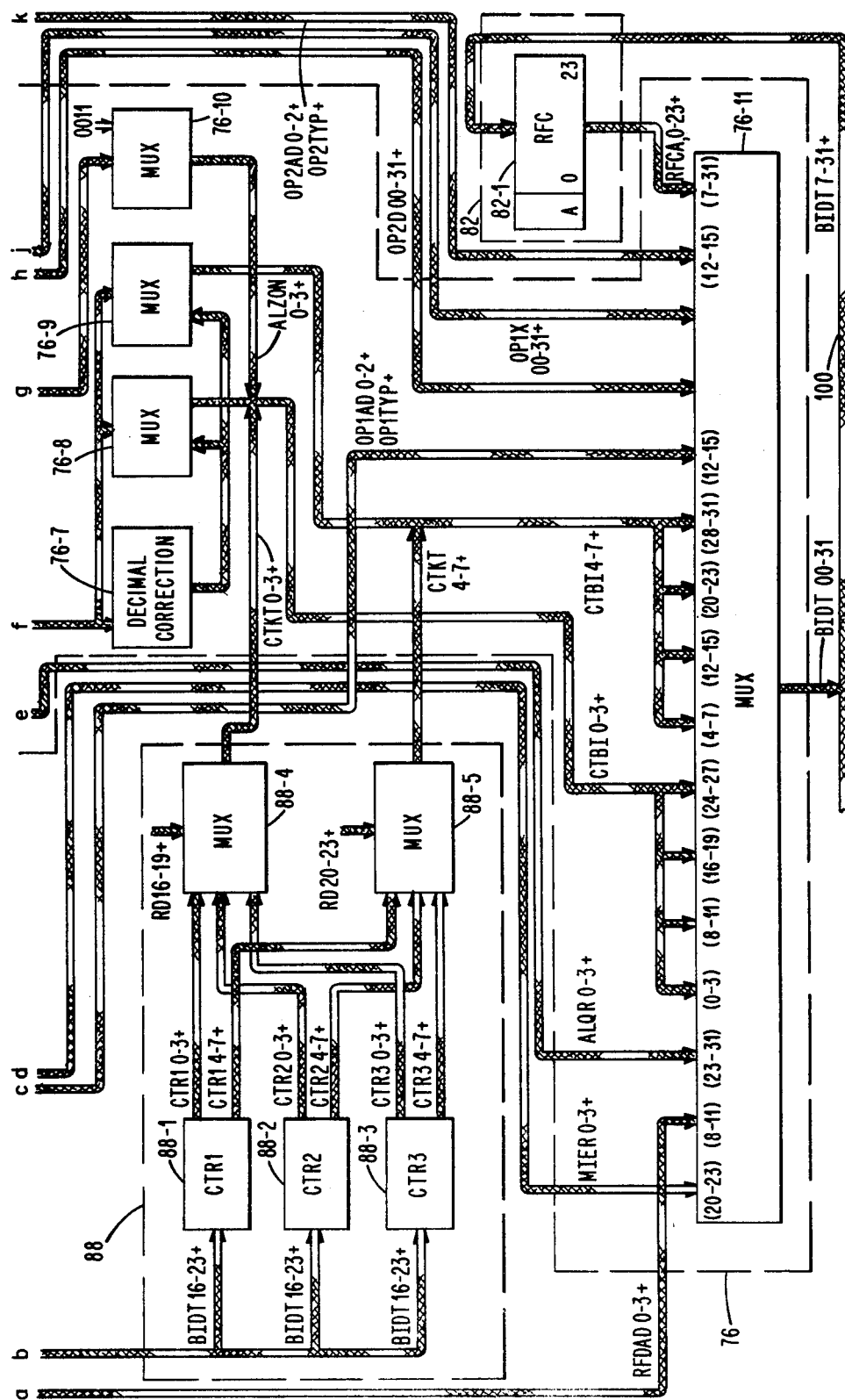

Referring to FIG. 3, the data scratchpad unit 50 includes a register file D (RFD) 50-1, a register/counter (AA) 50-2, a register/counter (AB) 50-3 and a MUX 50-4. RFD 50-1 includes 8 4-bit random access memories organized to store 16 32-bit double words. RFD 50-1 is addressed from either AA 50-2 via signals RFDAA k0-3+, MUX 50-4 and signals RFDAD 0-3+, or from AB 50-3 via signals RFDAB 0-3+, MUX 50-4 and signals RFDAD 0-3+. RFD 50-1 is coupled to BI bus 100 via signals BIDT 00-31−. AA 50-2 and AB 50-3 are loaded from BI bus 100 via signals BIDT 8-11+. During the decimal multiply operation, AA 50-2 stores the location in RFD 50-1 of the multiplicand words and AB 50-3 stores the location of the partial product words.

The descriptor operand length processing logic 88 includes a counter 1 88-1, a counter 2 88-2 and a counter 3 88-3 coupled to a MUX 88-4 via signals CTR1 0-3+, CTR2 0-3+ and CTR3 0-3+ respectively; and coupled to a MUX 88-5 via signals CTR1 4-7+, CTR2 4-7+ and CTR3 4-7+ respectively. Signals RD 16-19+ are applied to MUX 88-4 and signals RD 20-23+ are applied to MUX 88-5 to provide miscellaneous constants for transfer onto BI bus 100. Output signals CTKT 0-3+ of MUX 88-4 are coupled to their respective signals CTBI 0-3+. Output signals CTKT 4-7+ of MUX 88-5 are coupled to their respective signals CTBI 4-7+. Signals CTBI 0-3+ are coupled through MUX 76-11 to BI bus 100 signals BIDT 0-3+, BIDT 8-11+, BIDT 16-19+ and BIDT 24-27+ respectively. Signals CTBI 4-7+ are coupled through MUX 76-11 to BI bus 100 signals BIDT 4-7+, BIDT 12-15+, BIDT 20-23+ and BIDT 28-31+ respectively. Counter 1 88-1, counter 2 88-2 and counter 3 88-3 are loaded from BI bus 100 via signals BIDT 16-23+. During a portion of the decimal multiply operation, counter 1 88-1 stores the number of decimal digits in operand 1, and counter 2 88-2 stores the number of decimal digits in operand 2. During another portion of the decimal multiply operation, counter 1 88-1 and counter 2 88-2 store the number of multiplicand decimal digits remaining to be applied to multiply PROM 54 for the multiplier digit stored in multiply register (MIER) 52. Counter 3 88-3 may store the number of decimal digits of the multiplier remaining for processing or the effective length of the multiplicand.

The decimal binary ALU 76 includes a 4-bit arithmetic logic unit (ALU1) 76-2 for processing decimal numeric arithmetic operations and a 4-bit arithmetic logic unit (ALU2) 76-3 for processing alphanumeric operations and code conversions such as binary to decimal and decimal to binary. The ALU1 output signals ALUDG 0-3+ are applied to a MUX 76-8, a MUX 76-9 and a decimal correction unit 76-7. Output signals ALXS 60,61+ and ALUDG2− from decimal correction 76-7 are applied to MUX's 76-8 and 76-9. MUX 76-8 output signals CTBI 0-3+ and MUX 76-9 output signals CTBI 4-7+ are applied to MUX 76-11 as previously described. The output signals RFDAD 0-3+ of MUX 50-4 are applied to MUX 76-11. Output signals OP1X 00-31+ from RFD 50-1 and OP1 64 are applied to MUX 76-11 as are the output signals OP2D 00-31+ from OP2 66. The outputs of OP1A 84 and OP2A 78, signals OP1AD 0-2+, OP1TYP+, OP2AD 0-2+ and OP2TYP+, are applied to MUX 76-11 and appear at the MUX 76-11 output as signals BIDT 12-15+. Also applied to MUX 76-11 are signals ALQR+ from ALQR 72 and MIER+ from MIER 52 and appear at the MUX 76-11 output as signal BIDT 28-31+ and BIDT 20-23+.

The output of ALU2 76-3, signals ALUZN 0-3+, is applied to a MUX 76-10. Also, a hexadecimal 3 is applied to MUX 76-10 whose output signals ALZON 0-3+ are applied to MUX 76-11.

A register file C (RFC) 82-1 is coupled to the BI bus 100. Selected signals of BI bus 100, BIDT 00-31+, are stored in positions A,0-23 of RFC 82-1. The logic selecting the input bit positions is not shown since it is not pertinent to the invention. Output signals RFC A,0-23+ from RFC 82-1 are applied to MUX 76-11 and appear on BI bus 100 as signals BIDT 7-31+.

A units carry 76-5 and a tens carry 76-6 are coupled to ALU1 76-2 via a MUX 76-4. During the decimal multiply operation, the units carry 76-5 is operative when the multiply PROM 54 generates the units position decimal digit and the tens carry 76-6 is operative when the multiply PROM 54 generates the tens position decimal digit.

During the decimal multiply operation, a double word of the partial product is stored in OP2 66 and a double word of the multiplicand is stored in OP1 64. The OP2 66 output signals OP2D 00-31+ are applied to selector 70. The OP2A 78 output signals OP2AD 0-2+ and OP2TYP+ enable selector 70 to transfer the selected decimal digit to terminal A of ALU1 76-2 via signals AL2DG0+. The OP1A 84 output signals OP1AD 0-2+ and OP1TYP+ enable selector 68 to transfer the selected multiplicand digit, received via signals OP1X 00-31+, to multiply PROM 54 via signals OP1DG 0-3+. The output of multiply PROM 54, signals MULDG 0-3+, is applied to terminal B of ALU1 76-2 as signals AL1DG 0-3+. The sum is transferred back to OP2 66 in the selected partial product digit position via MUX's 76-8 or 76-9 and MUX 76-11 via BI bus 100.

A MUX 68-1 transfers the output of ALQR 72, signals ALQR 0-3+, or the output of selector 68-2, signals OP1DG 0-3+, to terminal B of ALU1 76-2 via signals OP1QD 0-3+ and AL1DG 0-3+. Typically, an operand 1 decimal digit in OP1 64 or RFD 50-1 and an operand 2 decimal digit in OP2 66 may be combined in ALU1 76-2 or the contents of ALQR 72 may be combined with a selected decimal digit position in OP2 66 during a divide operation.

RFC 82-1 of the address control unit 82 stores the instruction and the data descriptors describing the characteristics of the operands. RFC 82-1 is made up of 6 4-bit random access memories and a portion of a seventh random access memory organized as 16 25-bit words. Certain locations of RFC 82-1 are used as a scratchpad memory to temporarily store the contents of the various register/counters including AA 50-2, AB 50-3, counter 1 88-1, counter 2 88-2 and counter 3 88-3.

The decimal correction 76-7 is active during the arithmetic operation. BCD coded decimal digits are added by first modifying the selected OP2 66 digit in selector 70 by increasing its binary value by 6 (excess 6 code). When the modified OP2 66 digit (appearing as signals AL2DG 0-3+) is added to the unmodified digit selected from OP1 64 by the binary ALU1 76-2, the binary carry out of ALU1 76-2 is equivalent to a decimal carry. If a carry out is asserted, then the output of ALU1 76-2 appearing on signals ALUDG 0-3+ is the correct BCD representation of the sum. If carry out is not asserted, then ALUDG 0-3+ is an excess 6 representation of the sum and the decimal correction logic is activated to reduce this sum by 6 to produce the correct BCD representation.

Figure 4:
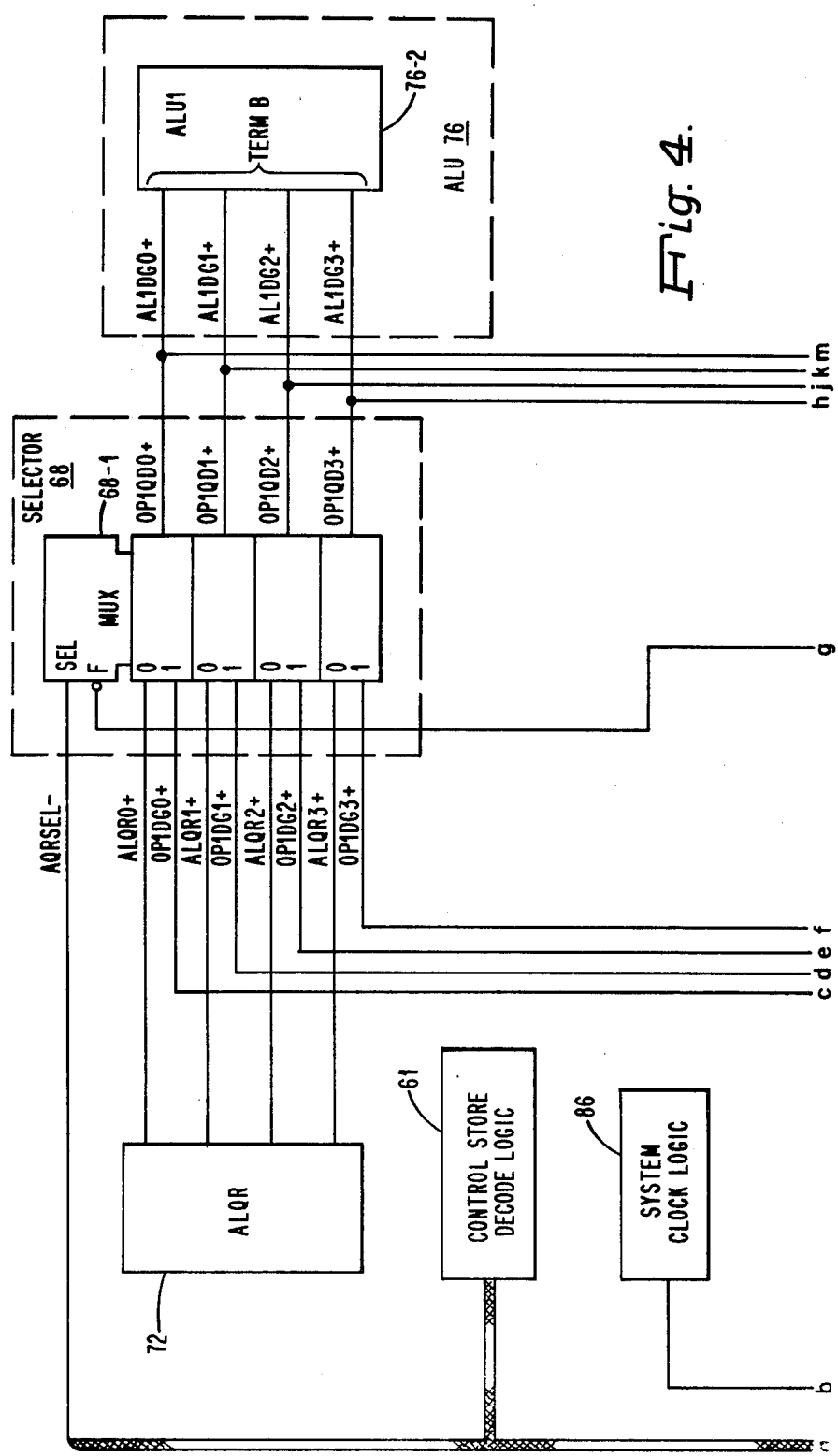
FIG. 4 is a detailed logic diagram which includes the multiply read only memory 54 which stores the products and the multiply register 52 which stores the multiplier digit.
Figure 4:
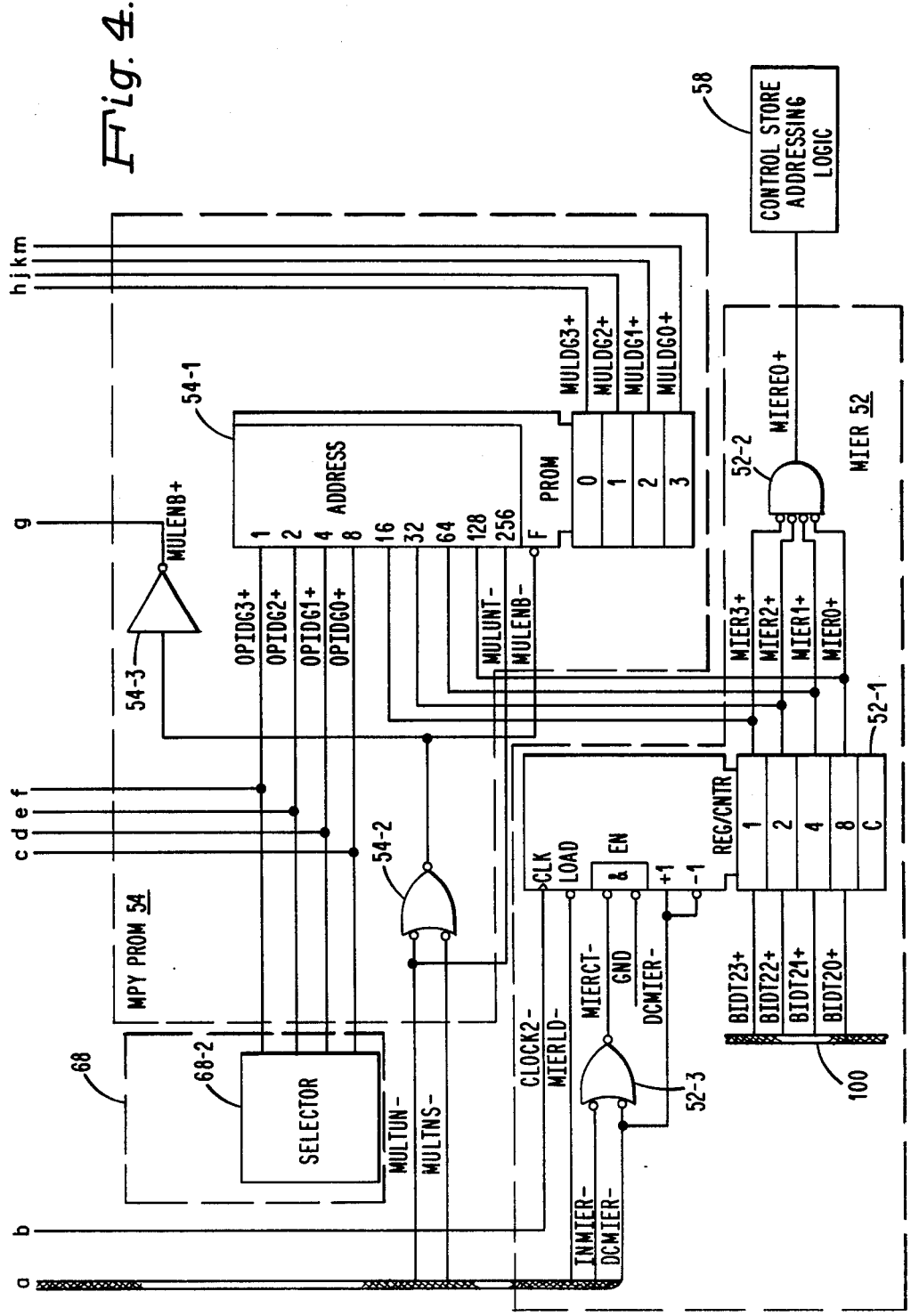

Referring to FIG. 4, the multiply PROM 54 includes a read only memory (PROM) 54-1 and a negative logic OR gate 54-2 which enables the PROM 54-1 via signal MULENB—. PROM 54-1 has the capacity for storing 512 decimal digits, 256 units position decimal digits and 256 tens position decimal digits.

The multiply register 52 includes a register/counter 52-1, a negative logic OR gate 52-3 and a negative AND gate 52-2. The register/counter 52-1 stores each multiplier digit in turn from the least significant multiplier digit to the most significant multiplier digit. The register/counter 52-1 is also used as a counter by the CIP 10 during the setup of the decimal multiply operation to store a count of the number of multiplicand double words that remain in main memory 4 prior to transfer to the CIP 10. The selector 68 includes the MUX 68-1. The selector 68-2 applies a selected multiplicand digit over signals OP1DG 0-3+ to the 8, 4, 2 and 1 input address terminals of PROM 54-1. The register/counter 52-1 applies the multiplier digit over signal lines MIER 0-3+ to the 128, 64, 32 and 16 input address terminals of PROM 54. The units position of the product appears on output signals MULDG 0-3+ when the PROM 54-1 is enabled by signal MULENB— at logical ZERO and signal MULUNT— at logical ZERO. The tens position of the product appears on the output signals MULDG 0-3+ when PROM 54-1 is enabled and signal MULUNT— is at logical ONE.

The Boolean equation for signal MULUNT— at logical ZERO is:

MULUNT— = [(($\overline{RD08}.\overline{RD09}.\overline{RD10}.\overline{RD11}$)+$\overline{RD16}$+$\overline{RD17}$+$\overline{RD18}$+RD19)(RD46.RD47.RD48.RD49)]

Either the tens multiplication signal MULTNS— or the units multiplication signal MULUNT— at logical ZERO applied to negative logic OR gate 54-2 enables PROM 54-1 by forcing signal MULENB— to logical ZERO.

The Boolean equation for signal MULTNS— at logical zero is:

MULTNS— = [(($\overline{RD08}.\overline{RD09}.\overline{RD10}.\overline{RD11}$)+$\overline{RD16}$+$\overline{RD17}$+$\overline{RD18}$+RD19)(RD46.RD47.RD48.RD49)]

Register/counter 52-1 is operative as a counter when keeping track of the number of double words of the multiplicand remaining in main memory 4 when the CIP 10 is being conditioned to perform the decimal multiply instruction. Register/counter 52-1 is decremented at CLOCK2— time when logic signal DCMIER— is at logic ZERO, forcing the output of NOR gate 52-3, enable signal MIERCT—, to logical ZERO and enabling the —1 terminal.

The Boolean equation for signal DCMIER— at logical ZERO is:

DCMIER— = [(RD08+RD09+RD10+RD11)($\overline{RD16}.\overline{RD17}.RD18.RD19$)]

When register/counter 52-1 is decremented to hexadecimal ZERO, signal MIEREO+ is forced to logical ONE, thereby signalling the control store addressing logic 58 that the transfer of multiplier double words from main memory 4 is concluded after the next tranfer.

Register/counter 52-1 is loaded with the number of double words and each multiplier hexadecmial digit in turn from BI bus 100 at CLOCK2— time when signal MIERLD— is at logical ZERO. Signal MIERLD— is applied to the LOAD terminal of register/counter 52-1.

The Boolean equation for signal MIERLD— at logical ZERO is:

MIERLD— = [(($\overline{RD08}.\overline{RD09}.\overline{RD10}.\overline{RD11}$)+$\overline{RD16}$+$\overline{RD17}$+$\overline{RD18}$+RD19)(RD46.RD47.RD48.RD49)]

A multiplier digit of hexadecimal ZERO forces signal MIEREO+ to logical ONE which signals the control store addressing logic 58 to bring in the next multiplier hexadecimal digit into register/counter 52-1.

MUX 76-1 provides a high impedance for signals OP1QD 0-3+ when the enable signal output of an inverter 54-3, MULENB+, is at logical ONE. The PROM 54-1 is enabled since signal MULENB— is at logical ZERO and output signals MULDG 0-3+ appear on signal lines AL1DG0+. During the loading of register/counter 52-1, the hexadecimal digit is transferred from OP1 64 in FIG. 3, selector 68, MUX 76-1, ALU1 76-2, MUX 76-9, MUX 76-11 and BI bus 100 signals BIDT 20-23+.

Referring to FIG. 4, output signals OP1DG 0-3+ are applied to terminal 1 of MUX 76-1. Output signals OP1QD 0-3+ are applied to terminal B of ALU1 76-2 via signals AL1DG 0-3+. Signal AQRSEL— is at logical ONE and signal MULENB+ is at logical ZERO.

The Boolean equation for AQRSEL— at logical ONE is:

AQRSEL— = [(RD08+RD09+RD10+RD11)($\overline{RD16}.RD17.RD18.RD19$)]

The ALQR 72 signals ALQR 0-3+ are applied to the terminal 0 of MUX 76-1.

It should be noted that the sequences of operation are controlled by the output signals RD 00-67+ from control store data register 62, FIG. 2. The control signals described by the Boolean equations are output signals from control store decode logic 61. (The Boolean notation [RD08.(RD09+RD10)] indicates an output of logical ONE when signal RD08 is at logical ONE and either or both signal RD09 is at logical ZERO or signal RD10 is at logical ONE.)

Register/counter 52-1 is a 74S169 logic circuit and MUX 76-1 is a 74S257 logic circuit described in "The TTL Data Book for Design Engineers", Second Edition, Copyright 1976, and published by Texas Instruments Inc.

PROM 54-1 is a 5624 logic circuit described in the "Intersil Semiconductor Products Catalog" published by Intersil Inc., 10900 N. Tantau Avenue, Cupertino, Calif. and issued March 1974.

The invention is described by the following example. The multiplicand is 009876543210+ and the multiplier is 78+. The product of the multiplicand and the multiplier is 770370380+.

Referring to FIG. 5, for the example operand 1, the multiplier is stored in word address locations hexadecimal 0502 and 0503 of main memory 4. The two multiplier digits are stored in byte addresses hexadecimal 0A05 and 0A06. The byte address is generated by appending a binary ZERO to the right of the word address for addressing the left hand byte, and appending a binary ONE to the right of the word address for addressing the right hand byte of the word.

Operand 2, the multiplicand, is stored in word locations hexadecimal 850 through 856 or byte locations hexadecimal 10A0 through 10AC of main memory 4. Note that for this example the multiplicand is stored as ASCII numeric characters.

The decimal operation code hexadecimal 0029 is stored in main memory of location hexadecimal 1000. Operand 1, the multiplier, is defined by the data descriptor 1, FIG. 6, hexadecimal E381, stored in location hexadecimal 1001. Data descriptor 1 indicates that operand 1 starts at a main memory 4 location hexadecimal 502 which is generated by adding the contents of CPU 2 register B1 (not shown and assumed to contain hexadecimal 500), to a displacement, hexadecimal 0002, stored in main memory 4 location hexadecimal 1002. Operand 2, the multiplicand, is defined by the data descriptor 2, hexadecimal 6D01, stored in main memory 4 location hexadecimal 1003. Data descriptor 2 indicates that operand 2 starts at location hexadecimal 850 which is generated in CPU 2 by adding the contents of CPU 2 register B1 (not shown) to the displacement, hexadecimal 350, stored in location 1004.

Under CPU 2 control, information derived from the contents of location hexadecimal 1000 through 1004 are transferred to the CIP 10 and stored in RFC 82-1 locations. The function codes are transferred from the CPU 2 and stored in function code register 96, FIG. 2. Function code hexadecimal 07 defines the double word received from main memory 4 as an instruction word, function code 09 as an effective byte address, function code 0F as the data descriptor and function code 1F as the last data descriptor. Note that the base address, hexadecimal 500, from CPU 2 register B1 (not shown) is modified in CPU 2 by the displacement to generate the effective byte address.

Figure 6:
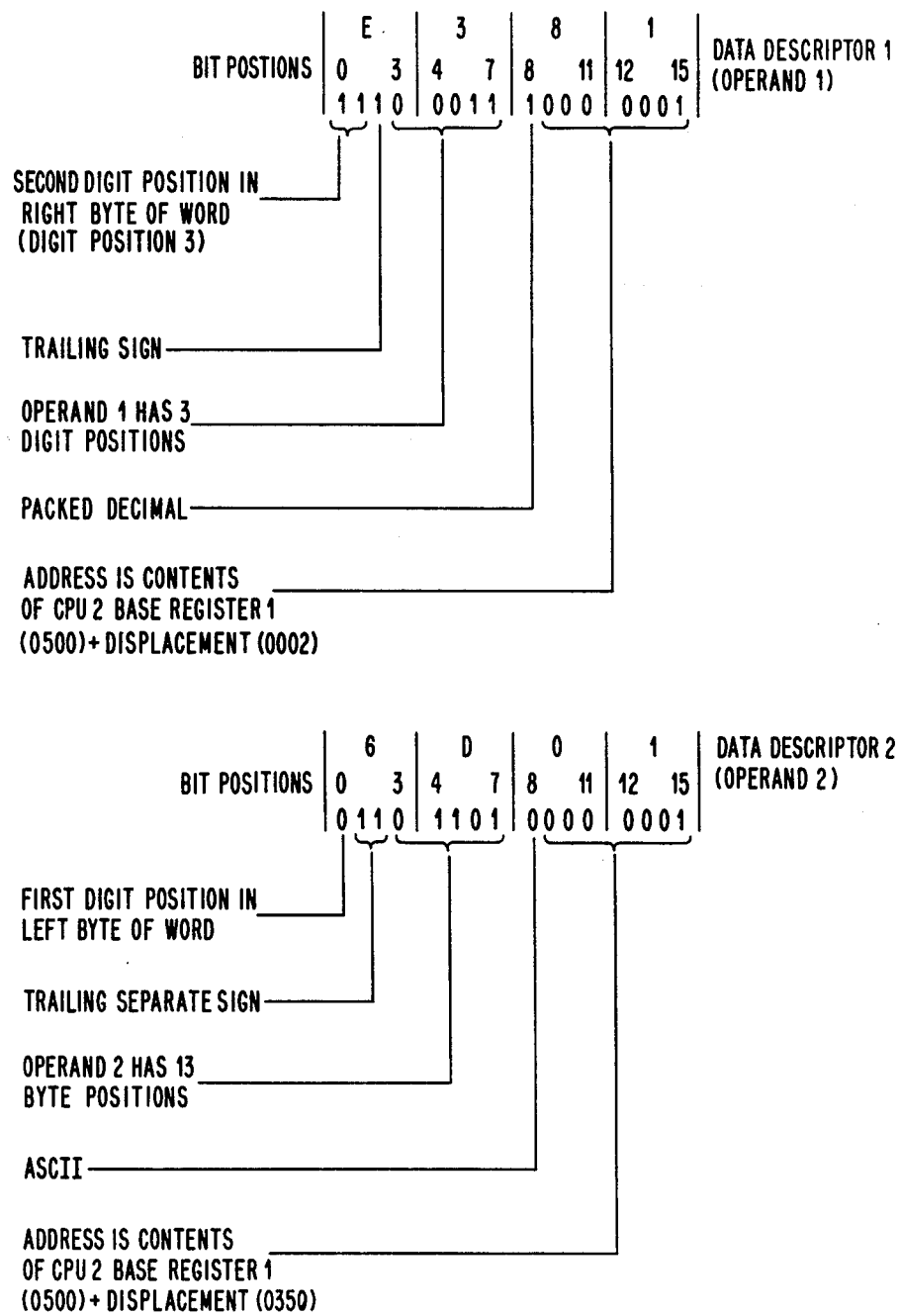
FIG. 6 describes the bit configurations of the data descriptors of the operands of the multiplication example.

Referring to FIG. 6, the data descriptors define the characteristics of the operands. The data descriptor is made up of 16 binary bits usually represented by 4 hexadecimal digits.

For the example, operand 1 was selected as packed decimal, that is, two decimal digits per byte; and operand 2 was selected as string decimal, one ASCII character per byte. Bit position 8 indicates that operand 1 contains packed decimal digits and operand 2 contains ASCII characters.

Each word includes 2 byte positions. Bit positions 0 and 1 of data descriptor 1 identify the location in the word of the first character in operand 1. Here binary bit 0 at binary ONE identifies the first character as being in the right hand byte of the word and binary bit 1 at binary ONE identifies the first character as being in the right hand portion of the byte. Referring to FIG. 5, the hexadecimal digit 7 of operand 1 is in the fourth location of word address hexadecimal 502 (byte address hexadecimal A05).

A binary ZERO in bit position 0 of data descriptor 2 identifies the first character as being in the left hand byte position, byte address location hexadecimal 10A0 of word address location hexadecimal 850.

Bit position 2 at binary ONE of data decriptor 1 and bit positions 1 and 2 at binary ONE of data descriptor 2 identify both operands as having trailing signs.

Bit postions 3 through 7 indicate that operand 1 is 3 4-bit characters long and operand 2 is 13 8-bit characters long.

Bit positions 9 through 15 identify the way CPU 2 will calculate the word address location in main memory 4 which contains the first character. The binary ONE in bit position 15 and binary ZERO's in bit positions 9 through 14 indicate that the CPU 2 will add the displacement from the word following the descriptor (FIG. 5) to the contents of CPU 2 base register 1 (not shown), hexadecimal 500, to indicate that operands 1 and 2 start at word address hexadecimal 502 and 850 respectively.

Figure 7:
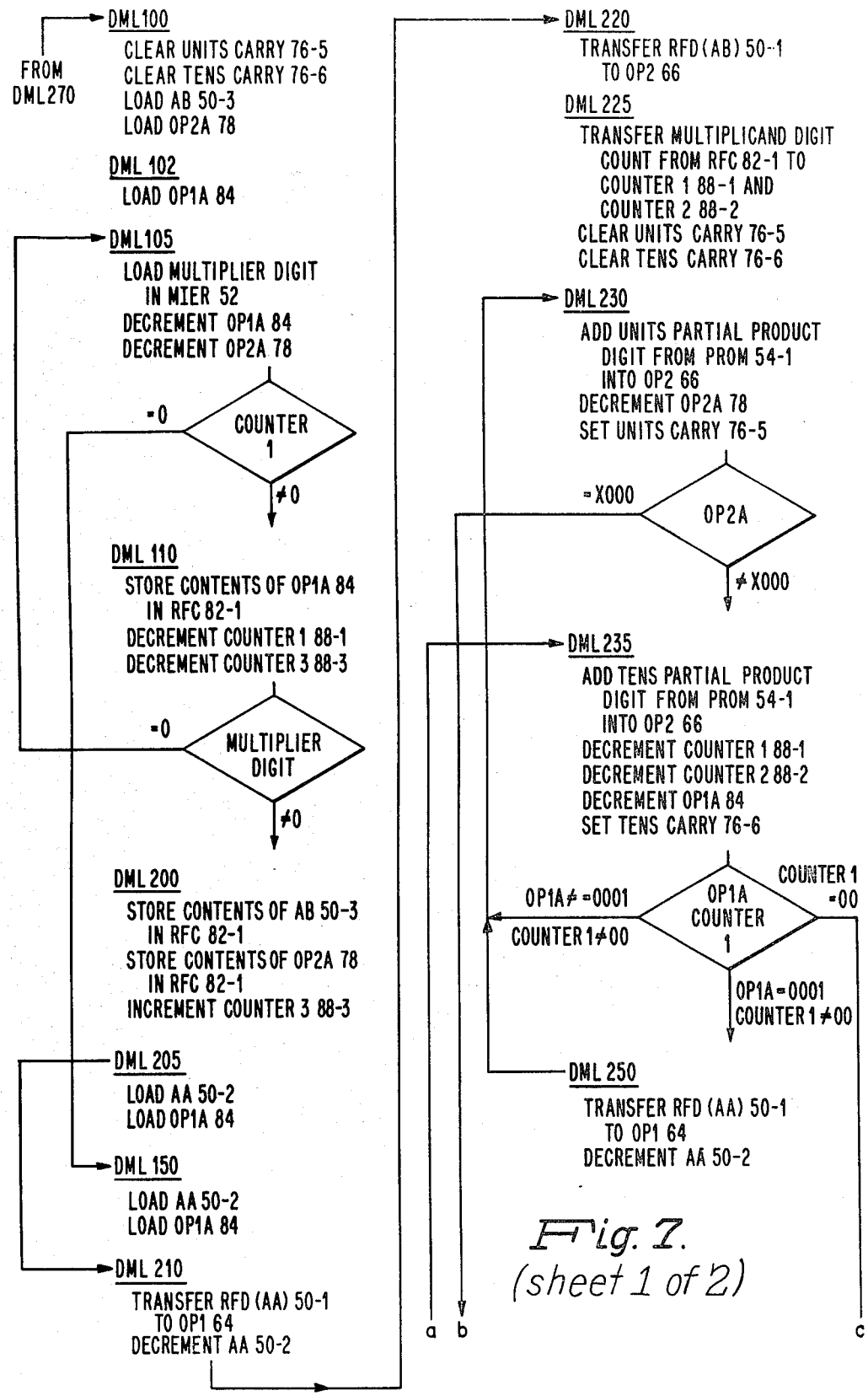
FIG. 7 is a flow diagram of the multiplication example.
Figure 7:
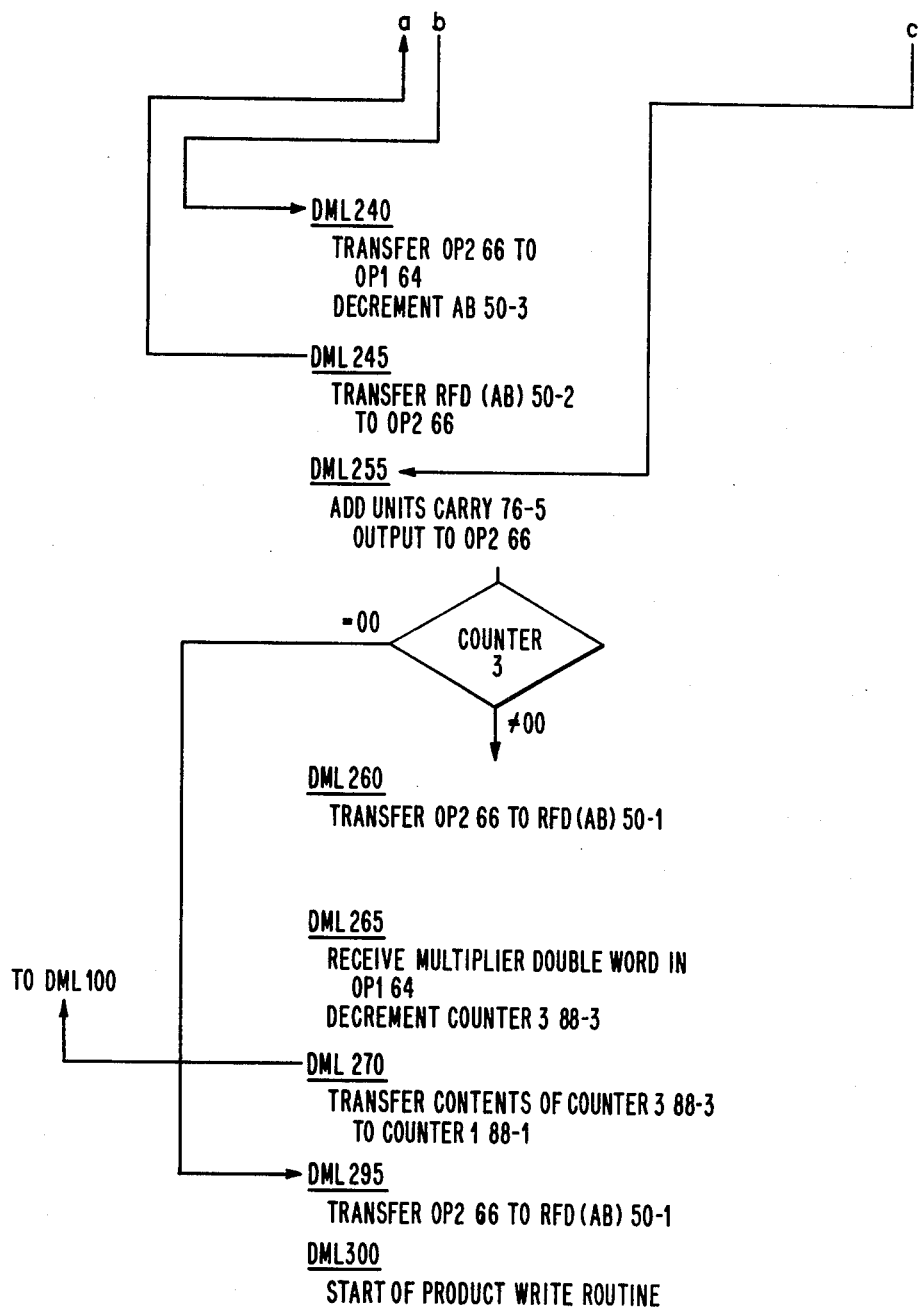

FIG. 7 shows the functions performed by specific logic blocks controlled by signal RD 00-67+ configurations. FIG. 8 shows the contents of the registers and counters after each of the detailed steps in performing the sample multiplication.

The multiplicand is stored in locations hexadecimal D, E, F and 0 of RFD 50-1 and locations hexadecimal 1 through 8 are cleared to hexadecimal ZERO in preparation for storing the partial products.

Initially, the multiplier double word XXX7 8BXX was received by an INR register (not shown) in common bus data interface 80 and transferred to OP1 64. The multiplier double word also remains in register INR for the decimal multiply operation.

In DML 100, units carry 76-5 and tens carry 76-6 are cleared to binary ZERO. Register/counter AB 50-3 is loaded with hexadecimal 8, the address in RFD 50-1 of the least significant digits of the product. OP2A 78 is loaded with hexadecimal F to point to bit positions 28-31 of OP2 66, the location of the sign character of the product.

In DML 102, OP1A 84 is loaded with hexadecimal C to point to bit positions 16-19 of OP1 64 the location in which digit "8" of the multiplier is stored.

In DML 105, the digit 8 is transferred to register/counter 52-1, FIG. 4, and OP1A 84 is decremented to hexadecimal B to point to the multiplier digit 7 in OP1 64. OP2A is decremented to hexadecimal E, the location of the least significant numeric digit of the product.

In DML 110, the contents of OP1A 84, hexadecimal B, the location of the next multiplier digit, are stored in RFC 82-1; counter 1 88-1 is decremented to hexadecimal 00. If the multiplier digit stored in register/counter 52-1 has been a hexadecimal 0 instead of the 8 assumed in this example, then the logic branches to DML 105 to transfer the next multiplier digit from OP1 64 to register/counter 52-1 and shifts the partial product starting point one digit to the left by decrementing OP2A 78. (Other multiply control words, not shown, read additional double words of the multiplier if OP1A 84 wraps around and decrements AB if OP2A 78 wraps around.)

In DML 200, the contents of AB 50-3, hexadecimal 8, and the contents of OP2A 78, hexadecimal E, are stored temporarily in RFC 82-1 for later retrieval. Counter 3 88-3 is incremented to show the number of multiplier digits remaining for transfer to MIER 52.

In DML 205, AA 50-2 is loaded with hexadecimal F, the address in RFD 50-1 of the least significant double word 33323130 of the multiplicand. OP1A 84 is loaded with hexadecimal 7, which was previously stored in RFC 82-1. Hexadecimal 7 in OP1A 84 points to the least significant byte position in OP1 64, hexadecimal 30.

In DML 210, the contents of location hexadecimal F of RFD 50-1, hexadecimal 33323130, are transferred to OP1 64. AA 50-2 is decremented to hexadecimal E, the address of the next double word of the multiplicand in RFD 50-1.

In DML 220, the contents of address hexadecimal 8 of RFD 50-1, hexadecimal 0000 0000 is tranferred to OP2 66 to clear OP2 66.

In DML 225, the count of the number of significant multiplicand digits, hexadecimal 09, is transferred from RFC 82-1 to counter 1 88-1 and counter 2 88-1. The units carry 76-5 and the tens carry 76-6 are cleared.

The development of the partial products is carried out in DML 230 and DML 235. In DML 230, the units partial product digit from PROM 54-1 is added to the digit stored in OP2 66 at the position stored in OP2A 78 and the sum stored back in OP2 66 at that position. If the units carry 76-5 is set, then a binary ONE is added during the ALU1 76-2 add cycle via the carry in signal in FIG. 3. If there is a carry out, then units carry 76-5 is set. OP2A 78 is decremented by 2 to point to the next higher order partial product position in OP2 66.

In DML 235, the tens partial product digit from PROM 54-1 is added to the digit stored in OP2 66 at the position stored in OP2A 78 (one less than in DML 230) and the sum stored back in OP2 66 at that position. If the tens carry 76-6 is set, then a binary ONE is added during the ALU1 76-2 add cycle via the carry in signal in FIG. 3. If a carry results, then the tens carry 76-6 is set. Note that a tens partial product digit is developed followed by a units partial product digit with OP2A 78 pointing to the same OP2 66 digit position.

When in DML 235, decrementing OP1A 84 from binary 0001 to binary (0)111 indicates that the last multiplicand digit in OP1 64 is being processed. After the tens digit is processed in DML 235, counter 1 88-1 is tested. If counter 1 88-1 does not equal hexadecimal 00 indicating that additional multiplicand digits are stored in RFD 50-1 and the last digit in OP1 64 is being processed, then a branch to DML 250 is made to transfer the next double word 37363534 from location hexadecimal E of RFD 50-1 to OP1 64. AA 50-2 is decremented to hexadecimal D, the location of the next higher order double word of the multiplicand. Since the multiplicand is in the string decimal form, OP1A 84 is decremented by 2. Subtracting 2 from binary (0)001 gives binary (0)111 since the OP1TYP bit is not involved in the incrementing or decrementing calculations. If the multiplicand was packed decimal, OP1A 84 would have been decremented by 1. OP1A 84 would contain hexadecimal 8 indicating packed decimal and the high order digit of OP1 64. Subtracting one again would give (1)111 or hexadecimal F. This is described in copending related application Ser. No. 220,220 entitled "A Data Processor Having Apparatus for Controlling the Selection of Decimal Digits of an Operand When Executing Decimal Arithmetic Instructions and application Ser. No. 220,219 entitled "A Data Processor Using a Read Only Memory for Selecting a Part of a Register Into Which Data Is Written".

During DML 230, the contents of OP2A 78 are tested for binary X000 indicating that the partial product which is always in packed decimal form has filled OP2 66. After DML 230 is processed, a branch to DML 240 is made and the partial product hexadecimal 23456800 is transferred to location hexadecimal 8 of RFD 50-1 and AA 50-2 is decremented to hexadecimal 7. In DML 245, the contents of location hexadecimal 7, hexadecimal 00000000, are transferred to OP2 66 and a branch to DML 235 is made to continue the development of the partial product using the multiplier digit 8.

Again when OP1A 84 is decremented from binary 0001, a branch to DML 250 is made and the last double word of the multiplicand hexadecimal 30303938 is transferred from location hexadecimal D of RFD 50-1 to OP1 64. A branch is made to DML 230 to continue the partial product development with multiplier digit 8.

During DML 235, counter 1 88-1 is tested for hexadecimal 00 indicating that all of the multiplicand digits were processed and a branch is made to DML 255 to add the last units carry to OP2 66 if units carry 76-5 was set.

In DML 260, the partial product in OP2 66 is transferred to location hexadecimal 7 of RFD 50-1.

In DML 265, the multiplier double word xxx78Bxx is restored in OP1 64 from the common bus data interface 80 and counter 3 88-3 is decremented to hexadecimal 00 indicating that the last multiplier digit is to be processed.

In DML 270, the contents of counter 3 88-3, hexadecimal 00, are transferred to counter 1 88-1 and a branch to DML 100 is made and the above operation repeated for a multiplier digit 7. (Note that the first partial product digit used is one digit to the left of the one used for the multiplier digit 8.)

Now when DML 255 is processed, the contents of counter 3 88-3 are tested and found to be hexadecimal 00 indicating that the multiplication is completed since all of the multiplier digits were processed.

A branch is made to DML 295 where the partial product stored in OP2 66 is transferred to location hexadecimal 7 and DML 300 is called as a routine to write the product into main memory 4.

Figure 9:
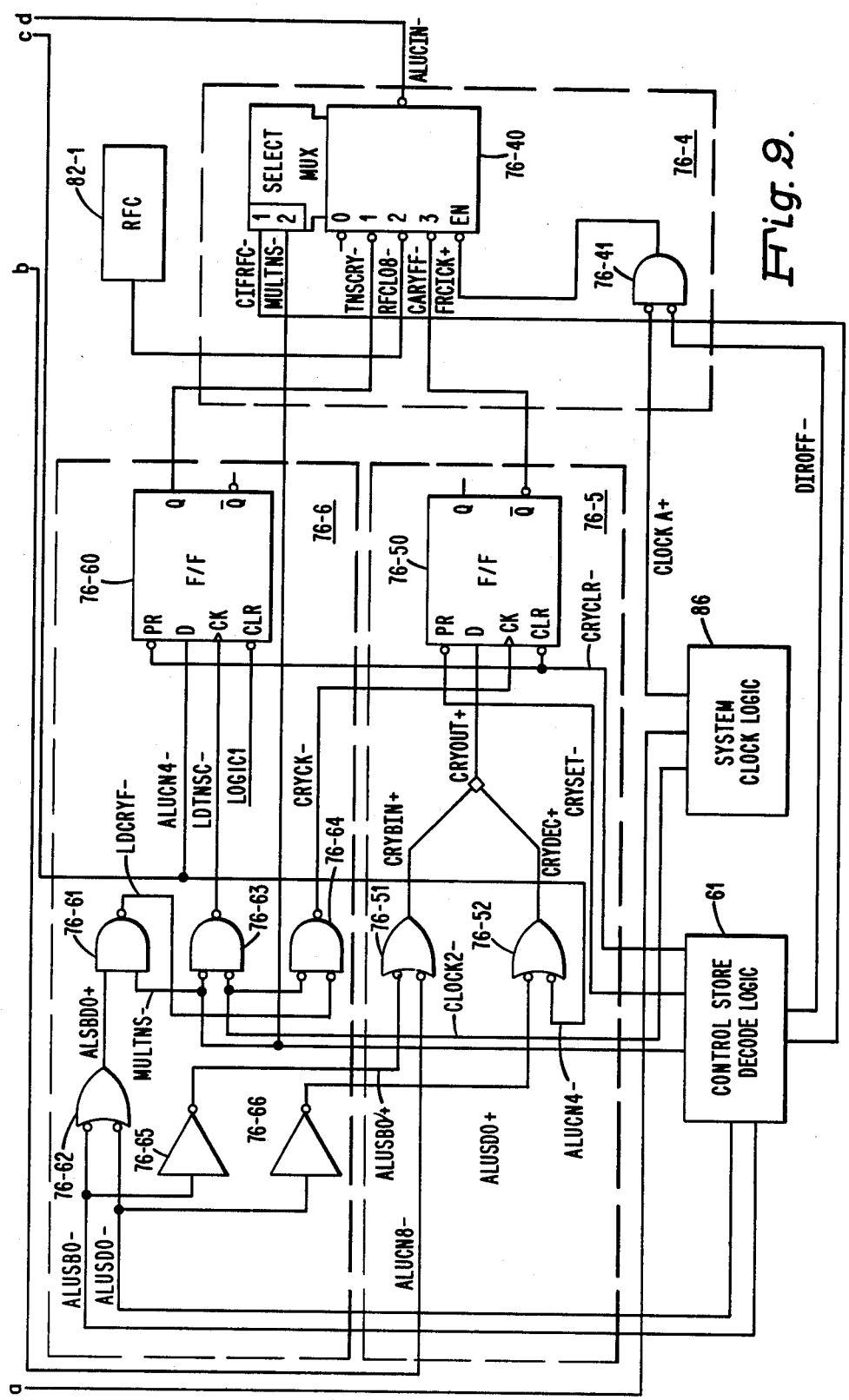
FIG. 9 is a detailed logic diagram of the carry apparatus.

FIG. 9 shows the detailed carry logic associated with ALU1 76-2 and ALU2 76-3. The decimal multiply operation as described supra uses the PROM 54-1 of FIG. 4 to read out the units digit and the tens digit for each multiplicand and multiplier digit. The partial product is developed by adding the units digit to a selected digit of the partial product and setting a units carry flop 76-5 if a carry resulted, and adding the tens digit to a hext higher selected digit of the partial product and setting a tens carry flop 76-6 if a carry resulted. The output of the units carry flop 76-5, signal CARYFF—, is selected by a MUX 76-40 during the cycle in which the next units digit output of PROM 54-1 is added to the next higher selected digit of the partial product. The output of the tens carry flop 76-6, signal TNSCRY—, is selected by MUX 76-40 during the development of the next tens partial product. This is shown in FIG. 8.

Towards the end of the decimal multiply operation during a DML 230 units cycle, a digit 9, the result of multiplying 7×37=X9 (37 is the ASCII code for numeric 7), is added to the underlined partial product digit 7947 to develop the partial product 7937 and setting units carry flop 76-5. During the following DML 235 tens cycle, a digit 4, the result of multiplying 7×37=4X, is added to the underlined partial product digit 7937 to develop the partial product 7337 and setting tens carry flop 76-6.

During the next DML 230 units cycle, a digit 6, the result of multiply 7×38=X6, and the units carry are added to the underlined partial product digit 7337 to develop the partial product 7037 and again setting units carry flop 76-5. During the following DML 235 tens cycle, a digit 5, the result of multiplying 7×38=5X, and the tens carry are added to 7037 to develop the partial product 3037 and again setting the tens carry flop 76-6. On successive DML 230 and DML 235 cycles, the partial products 7037 and 77037 are developed as described supra.

MUX 76-40 selects the units carry output signal CARYFF— when signal CIFRFC— is at logical ONE and signal MULTNS— at logical ONE indicates a units carry, and selects the tens carry output signal TNSCRY— when signal CIFRFC— is at logical ONE and signal MULTNS— at logical ZERO indicates a tens carry. The MUX 76-40 output signal ALUCIN— at logical ZERO applied to ALU1 76-2 adds the carry to the arithmetic operation performed by ALU1 76-2. A carry output signal ALUCN4— is forced to logical ZERO when a carry results from the arithmetic operation performed on the digits applied to ALU1 76-2. Signal ALUCN4— applied to the D terminal conditions flop 76-60 to reset. Signal ALUCN4— applied to a NOR gate 76-52 forces signal CRYDEC+ to logical ONE, forcing signal CRYOUT+, the input to terminal D, to logical ONE conditioning flop 76-5 to set. Flop 76-5 sets on the rise of clock signal CARYCK— to store the units carry and flop 76-60 resets on the rise of clock signal LDTNSC— to store the tens carry.

Clock signal CARYCK—, the output of negative AND gate 76-64, rises on the rise of clock signal CLOCK2— with signal LDCRYF— at logical ZERO. Clock signal LDTNSC—, the output of negative AND gate 76-63, rises on the rise of clock signal CLOCK2— with signal MULTNS— at logical ZERO.

Control store decode logic 61 conditions the setting of units carry flop 76-5 during the processing of a decimal instruction by forcing signal ALUSDO— to logical ZERO, forcing signal LDCRYF— to logical ZERO via a NOR gate 76-62, signal ALSBDO+ and a NAND gate 76-61 with signal MULTNS— at logical ONE. Also, signal ALUSDO+, the output of an inverter 76-66, at logical ONE conditions NOR gate 76-52 to be responsive to carry signal ALUCN4— from ALU1 76-2. Similarly, signal ALUSBO— is forced to logical ZERO to condition the units carry flop 76-5 during the processing of a binary instruction by forcing signal LDCRYF— to logical ZERO and the output of an inverter 76-65, signal ALUSBO+, to logical ONE. This conditions a NOR gate 76-51 to be responsive to the ALU2 76-3 carry signal ALUCN8— at logical ZERO to set units carry flop 76-5 via signals CRYOUT+. Also, ALU1 76-2 and ALU2 76-3 are coupled together during certain binary instructions and the carry out signal ALUCN4— of ALU1 76-2 is coupled to the carry in terminal of ALU2 76-3.

The carry signals CARYFF— and TNSCRY— are applied to input terminals 1 and 3 respectively of MUX 76-40. Signal RFCLO8— is applied to input terminal 2 from RFC 82-1 when executing the binary hexadecimal conversion to introduce the current binary digit into a decimal doubling algorithm.

The input terminals are selected by control store decode logic 61 via signals CIFRFC— and MULTNS— applied to select terminals 1 and 2 respectively. During the decimal multiply instruction, DML 230 of FIG. 7 selects the units carry signal CARYFF— by forcing signals CIFRFC— and MULTNS— to logical ONE, and DML 235 selects the tens carry signal TNSCRY— by forcing signal CIFRFC— to logical ONE and MULTNS— to logical ZERO via control store decode logic 61.

The carry in signal ALUCIN— may be forced to logical ZERO to indicate a carry by forcing the enable input signal FRCICK+, the output of a NAND gate 76-41, to logical ONE when signal DIROFF— and the clock A+ signals are at logical ZERO. This is required during the divide operation to make more efficient a test whether the next subtraction would result in a negative remainder. The test is accomplished by subtracting the most significant digit of the divisor from the most significant digit of the remainder. If the result is negative, then there is no need to go through the full subtraction and add back sequence. During the test, signal ALUCIN— is forced to logical ZERO and forces the ALU1 76-2 resultant output to indicate the subtraction of the terminal B input signals from the terminal A input signals.

The CRYCLR— signal generated by control store decode logic 61 sets tens carry flop 76-6 and resets units carry flop 76-5 to clear the tens and units carry. This is accomplished during the decimal multiply instruction processing during the DML 100 and DML 225 cycles.

Flops 77-50 and 77-60 are 74S74 logic circuits and MUX 76-40 is a 74S257 logic circuit described in the aforementioned "TTL Data Book for Design Engineers".

The Boolean expressions for the control store decode logic signals are:

$$ALUSB0-=[(RD08+RD09+RD10+RD11).(\overline{R\text{-}D16}.\overline{RD17}.\overline{RD18}.\overline{RD19})]$$

$$ALUSD0-=[(RD08+RD09+RD10+RD11).(\overline{R\text{-}D16}.\overline{RD17}.\overline{RD18}.\overline{RD19})]$$

$$CRYCLR-=[(RD08+RD09+RD10+RD11).(\overline{R\text{-}D16}.\overline{RD17}.\overline{RD18}.\overline{RD19})]$$

$$CRYSET-=[(RD08+RD09+RD10+RD11).\overline{RD16}.\overline{RD17}.RD18.RD19]$$

$$CIFRFC-=[((\overline{RD08}.\overline{RD09}.\overline{RD10}.\overline{RD11})+\overline{RD16}+\overline{RD17}+\overline{RD18}+RD19)(RD46.RD47.RD48.\overline{R\text{-}D49})]$$

$$DIROFF-=[((\overline{RD08}.\overline{RD09}.\overline{RD10}.\overline{RD11})+\overline{RD16}+\overline{RD17}+\overline{RD18}+RD19)(RD46.RD47.RD48.\overline{R\text{-}D49})]$$

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. Apparatus for generating a carry during the execution of a decimal multiply instruction wherein a decimal digit multiplier is multiplied by a decimal digit multiplicand comprising:
   first means responsive to a multiplier decimal digit and a first and subsequent multiplicand decimal digits for generating a first and subsequent units product decimal digits during a first and subsequent odd cycles of operation and a first tens product decimal digit during a second and subsequent even cycles of operation;
   second means for storing partial product decimal digits;
   adder means coupled to said first and second means and responsive during said first cycle of operation to said first units product decimal digit and a first of said partial product decimal digits for generating a first units sum decimal digit for replacing said first partial product decimal digit in said second means and a carry signal in a first state indicative of a units carry or said carry signal in a second state indicative of no units carry, and responsive during said second cycle of operation to said first tens product decimal digit and a second of said partial product decimal digits for generating a first tens sum decimal digit for replacing said second partial product decimal digit in said second means and said carry signal in said first state indicative of a tens carry or said carry signal in said second state indicative of no tens carry;

units carry means coupled to said adder means for storing said carry signal in said first state during said first cycle of operation;

tens carry means coupled to said adder means for storing said carry signal in said first state during said second cycle of operation;

multiplexer means coupled to said units and said tens carry means for receiving said carry signal in said first state during a third cycle of operation from said units carry means, and receiving said carry signal in said second state during a fourth cycle of operation;

said first means responsive to said multiplier decimal digits and a second multiplicand decimal digit for generating a second units product decimal digit during said third cycle of operation and a second tens product decimal digit during said fourth cycle of operation;

said adder means being further coupled to said multiplexer means for receiving, during said third cycle of operation, said carry signal in said first state, said second units product decimal digit, and said second partial product decimal digit for generating a second units sum decimal digit for replacing said second partial product decimal digit in said second means, and receiving, during said fourth cycle of operation, said carry signal in said second state, said second tens product decimal digit and a third partial product decimal digit for generating a second tens sum decimal digit for replacing said third partial product decimal digit in said second means;

wherein said first multiplicand decimal digit is the least significant decimal digit and said second multiplicand decimal digit is representative of the next higher and subsequent higher order decimal digits, and said multiplier decimal digit is representative of the multiplier decimal digits with the exception of the least significant multiplier decimal digit.

2. The apparatus of claim 1 wherein said units carry means comprises:
a first flip-flop being responsive during said first, said third and said subsequent odd numbered cycles of operation, to said carry signal in said first state for setting, and responsive to said carry signal in said second state for resetting, if said first flip-flop was set during the previous odd numbered cycle of operation.

3. The apparatus of claim 2 wherein said tens carry means comprises:
a second flip-flop being responsive, during said second, said fourth and said subsequent even numbered cycles of operation, to said carry signal in said first state for setting, and responsive to said carry signal in said second state for resetting said second flip-flop if said second flip-flop was set during the previous even numbered cycle of operation.

4. The apparatus of claim 3 wherein said multiplexer means comprises:
a multiplexer coupled to said first and said second flip-flops for transferring said carry signals from said first flip-flop to said adder means during said odd numbered cycles of operation and transferring said carry signal from said second flip-flop to said adder means during said even numbered cycles of operation, said adder means adding a units carry in developing the units sum decimal digits during said odd numbered cycles of operation in which said carry signal is in said first state, and said adder means adding a tens carry in developing the tens sum decimal digits during said even numbered cycles of operation.

5. The apparatus of claim 4 further comprising:
control means responsive to a predetermined configuration of control signals and coupled to said first means, said units and tens carry means, and said multiplexer means and generating a multiply tens signal in a first state indicative of said odd numbered cycles of operation and said multiply tens signal in a second state indicative of said even numbered cycles of operation, said control means further generating a units carry clear signal for resetting said first flip-flop and a tens carry clear signal for resetting said second flip-flop.

* * * * *